United States Patent
Chen et al.

(10) Patent No.: US 11,622,279 B2
(45) Date of Patent: Apr. 4, 2023

(54) METHOD FOR DOWNLINK RECEPTION IN UNLICENSED BAND AND USER EQUIPMENT USING THE SAME

(71) Applicant: Industrial Technology Research Institute, Hsinchu (TW)

(72) Inventors: Jen-Hsien Chen, Chiayi County (TW); Wei-Chen Pao, Hsinchu County (TW); Chien-Min Lee, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 52 days.

(21) Appl. No.: 16/729,527

(22) Filed: Dec. 30, 2019

(65) Prior Publication Data
US 2020/0221306 A1 Jul. 9, 2020

Related U.S. Application Data

(60) Provisional application No. 62/789,978, filed on Jan. 8, 2019.

(51) Int. Cl.
*H04W 16/14* (2009.01)
*H04W 72/23* (2023.01)

(52) U.S. Cl.
CPC .......... *H04W 16/14* (2013.01); *H04W 72/23* (2023.01)

(58) Field of Classification Search
CPC ............... H04W 16/14; H04W 72/042; H04W 52/0225; H04W 52/0209; Y02D 30/70; H04L 5/0048; H04L 5/0053; H04L 5/001; H04L 1/0038
See application file for complete search history.

(56) References Cited

U.S. PATENT DOCUMENTS

| 10,334,447 | B2 | 6/2019 | Vajapeyam et al. |
| 2016/0242186 | A1 | 8/2016 | Nissila |
| 2016/0309451 | A1* | 10/2016 | Ye ....................... H04W 72/042 |
| 2017/0048828 | A1 | 2/2017 | Um et al. |
| 2017/0093620 | A1 | 3/2017 | Um et al. |
| 2017/0289936 | A1 | 10/2017 | Chae et al. |
| 2017/0332358 | A1 | 11/2017 | Park et al. |
| 2018/0176946 | A1 | 6/2018 | Sun et al. |

(Continued)

FOREIGN PATENT DOCUMENTS

| CN | 1947023 | 4/2007 |
| CN | 107005355 | 8/2017 |

(Continued)

OTHER PUBLICATIONS

Qualcomm et al. ("TxOP Frame Structure for NR unlicensed", May 2018) ("Qualcomm") R1-1807386 (Year: 2018).*

(Continued)

*Primary Examiner* — John D Blanton
(74) *Attorney, Agent, or Firm* — JCIPRNET

(57) ABSTRACT

An aspect of the disclosure includes a method for downlink reception in unlicensed band used by a UE, including: after a data burst transmitted in a unlicensed band, stopping monitoring a downlink channel in response to ending of the data burst; and in response to receiving a reference signal or in response to expiration of a time period, starting monitoring the downlink channel, wherein the data burst is transmitted via a first bandwidth part (BWP) and initiated by a base station.

28 Claims, 18 Drawing Sheets

(56) References Cited

U.S. PATENT DOCUMENTS

| | | | |
|---|---|---|---|
| 2018/0249497 A1 | 8/2018 | Noh et al. | |
| 2018/0376463 A1* | 12/2018 | Sun | H04L 5/0053 |
| 2019/0132857 A1 | 5/2019 | Babaei et al. | |
| 2019/0132862 A1 | 5/2019 | Jeon et al. | |
| 2019/0150170 A1 | 5/2019 | Park et al. | |
| 2020/0045696 A1* | 2/2020 | Huang | H04W 74/0808 |
| 2021/0167930 A1* | 6/2021 | Jeon | H04W 76/28 |
| 2021/0168897 A1* | 6/2021 | Mi | H04W 68/02 |
| 2021/0176762 A1* | 6/2021 | Islam | H04W 72/1289 |

FOREIGN PATENT DOCUMENTS

| | | |
|---|---|---|
| CN | 107005386 | 8/2017 |
| CN | 107113143 | 8/2017 |
| CN | 107580801 | 1/2018 |
| EP | 3079436 | 10/2016 |
| EP | 3373497 | 9/2018 |
| TW | I605728 | 11/2017 |

OTHER PUBLICATIONS

Ericsson, "On DL signals and channels for NR-U", 3GPP TSG-RAN WG1 Meeting #95, Nov. 12-16, 2018, pp. 1-6.

Qualcomm Incorporated, "TxOP Frame Structure for NR unlicensed", 3GPP TSG-RAN WG1 Meeting #95, Nov. 12-16, 2018, pp. 1-13.

Nokia, Nokia Shanghai Bell, "On the Frame structure and Wideband operation for NR-U", 3GPP TSG-RAN WG1 Meeting #95, Nov. 12-16, 2018, pp. 1-14.

Intel Corporation, "On the NR-unlicensed frame structure", 3GPP TSG-RAN WG1 Meeting #95, Nov. 12-16, 2018, pp. 1-7.

Mediatek Inc., "Frame Structure for NR-U operation", 3GPP TSG-RAN WG1 Meeting #95, Nov. 12-16, 2018, pp. 1-11.

Huawei, Hisilicon, "NR numerology and frame structure for unlicensed bands", 3GPP TSG-RAN WG1 Meeting #95, Nov. 12-16, 2018, pp. 1-13.

Huawei, Hisilicon, "NR frame structure and scheduling on unlicensed bands", 3GPP TSG RAN WG1 Meeting #92bis, Apr. 16-20, 2018, pp. 1-8.

Huawei, Hisilicon, "NR numerology and frame structure for unlicensed bands", 3GPP TSG RAN WG1 Meeting #94bis, Oct. 8-12, 2018, pp. 1-14.

3GPP, "Technical Specification; 3rd Generation Partnership Project; Technical Specification Group Radio Access Network; NR; Medium Access Control (MAC) protocol specification (Release 15)," 3GPP TS 38.321 V15.3.0, Sep. 2018, pp. 1-76.

"Office Action of Taiwan Counterpart Application", dated Dec. 14, 2020, p. 1-p. 13.

Qualcomm Incorporated, "TxOP Frame Structure for NR unlicensed", 3GPP TSG RAN WG1 Meeting #92, Feb. 26-Mar. 2, 2018, pp. 1-5.

"Office Action of China Counterpart Application", dated Jul. 4, 2022, p. 1-p. 7.

"Notice of allowance of China Counterpart Application", dated Jan. 5, 2023, p. 1-p. 5.

Shi Junfeng et al., "3GPPLAA-LTE physical layer key technology standardization research", Telecommunications Network Technology No. 12, with English translation thereof, Dec. 2015, pp. 1-14.

* cited by examiner

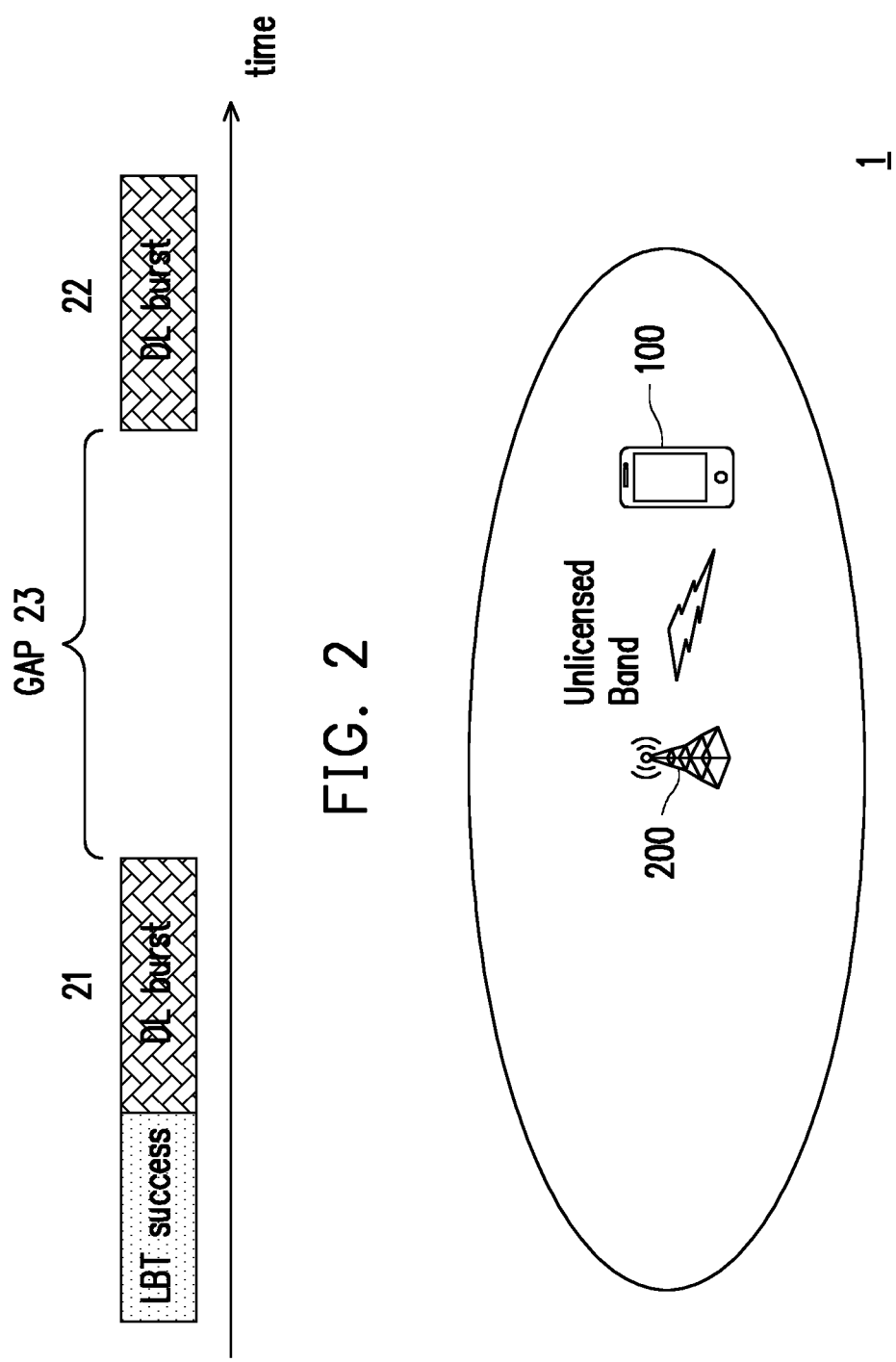

METHOD FOR DOWNLINK RECEPTION IN UNLICENSED BAND AND USER EQUIPMENT USING THE SAME

CROSS-REFERENCE TO RELATED APPLICATION

This application claims the priority benefit of U.S. provisional application Ser. No. 62/789,978, filed on Jan. 8, 2019. The entirety of the above-mentioned patent application is hereby incorporated by reference herein and made a part of this specification.

TECHNICAL FIELD

This disclosure is directed to a method for downlink reception in unlicensed band and a user equipment using the same.

BACKGROUND

Along as a rapid growth in the amount of wireless traffic, it is predicted that the amount of the wireless network traffic would increase intensely in the recent years. To satisfy such huge demand in wireless network traffic, cellular operators of the wireless communication system are looking into a direction from using crowded licensed band toward using an unlicensed band, so as to offload this huge network traffic with more bandwidth. The unlicensed bands may include the industrial, scientific and medical (ISM) bands, television whitespaces, and the bands without license requirements. Although there may be many other signals (e.g., Wi-Fi, Bluetooth, and so on) in the unlicensed bands, the wireless communication system using the unlicensed bands have provided a Listen Before Talk (LBT) procedure/channel access procedure to effectively avoid a collision. For example, in the fifth generation (5G) system, the LBT procedure may be performed in the unlicensed bands before a new radio unlicensed (NR-U) next generation node b (gNB) communicates with a UE via a unlicensed band.

On the other hand, in a future wireless communication system, a bandwidth part (BWP) may be used to allocate some bands to a terminal which has difficulty in supporting a broadband in a wireless communication system using the broadband. Various numerologies (e.g., SCS, CP length, etc.) may be supported for the same carrier in the future wireless communication system. That is, depending on various numerologies are supported in a carrier, transceiving numerologies may be set differently according to the BWPs. Besides, a BWP may include a set of consecutive physical resource blocks (PRBs) in unlicensed bands in the future wireless communication system. That is, the base station (e.g. gNB in 5G system) may perform the LBT procedure on the different BWPs or on the different sub-bands in one BWP to use the channel has not been occupied by the other wireless communication terminal. Once the LBT procedure is successfully performed, the base station is able to communicate with a UE via a BWP in a unlicensed band.

In the fifth generation (5G) system, the transmission of a data burst in an unlicensed band is performed via one BWP after a successful LBT procedure/channel access procedure, and the gNB may indicate a format of UL-DL configuration for each slot within the data burst. For example, FIG. 1 is a schematic diagram of a data burst transmitted via a BWP in an unlicensed band. Referring to FIG. 1, the data burst 10 transmitted via a BWP #1 includes a DL burst 11 and a UL burst 12. The DL burst 11 is transmitted through 6 slots (i.e., Slot #0 to Slot #5), and the UL burst 12 is transmitted through 4 slots (i.e., Slot #6 to Slot #9). Herein, the PDCCHs in Slot #0 to Slot #5 are configured to indicate the format of UL-DL configuration of the data burst 10. For example, PDCCH 10 in the Slot #0 is configured to indicate the format of UL-DL configuration of Slot #0 to Slot #9, and PDCCH 11 in the Slot #1 is configured to indicate the format of UL-DL configuration of Slot #1 to Slot #9.

That is, the UE may keep monitoring PDCCH on a BWP after a successful LBT procedure, such that the UE is able to transmit the data burst to the gNB or to receive the data burst from the gNB. Namely, the UE may keep monitoring PDCCH on a BWP to determine whether a next data burst exists, which may causes severe UE power consumption. However, in an unlicensed band, there is a time period in which the gNB may not provide service to the UE due to at least one of the following reasons: the gNB is performing a LBT procedure; the gNB is releasing a channel; the gNB is performing transmission time alignment among a plurality of TRPs/gNBs; the gNB stops providing service (e.g., power off); the gNB is not ready for data burst transmission (e.g., burst boundary); and so on. For example, FIG. 2 is a schematic diagram of a transmission gap between two data bursts. Referring to FIG. 2, there is a time gap 23 between the DL burst 21 and the DL burst 22. During the time gap 23, the gNB may stop providing service to the UE due to at least one of the reasons set above. That is, the operation of monitoring PDCCH on a BWP during the time gap 23, in which the gNB may not provide service, is an unnecessary operation, and the UE may consume extra power because of such unnecessary operation.

SUMMARY

Accordingly, the disclosure is directed to a method for downlink reception in unlicensed band and a user equipment using the same.

In one of exemplary embodiments, the disclosure is directed to a method for downlink reception in unlicensed band used by a UE, and the method would include but no limited to: after a data burst transmitted in a unlicensed serving cell, monitoring a first DL signal; and in response to receiving the first DL signal, starting monitoring a second DL signal, wherein the data burst is transmitted via a first bandwidth part (BWP).

In one of the exemplary embodiments, the disclosure is directed to a UE which would include not limit to: a storage medium, a transceiver, and a processor coupled to the storage medium, and configured to: after a data burst transmitted in a unlicensed serving cell, monitoring a first DL signal; and in response to receiving the first DL signal, starting monitoring a second DL signal, wherein the data burst is transmitted via a first BWP.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is a schematic diagram of a transmission gap between two data bursts.

FIG. 3 is a schematic diagram of a communication system according to an embodiment of the disclosure.

FIG. 15 is a schematic diagram of suspending and resuming a BWP inactivity timer according to an embodiment of the disclosure.

FIG. 16 is a schematic diagram of suspending and resuming a BWP inactivity timer according to an embodiment of the disclosure.

DETAILED DESCRIPTION

Figure 1:
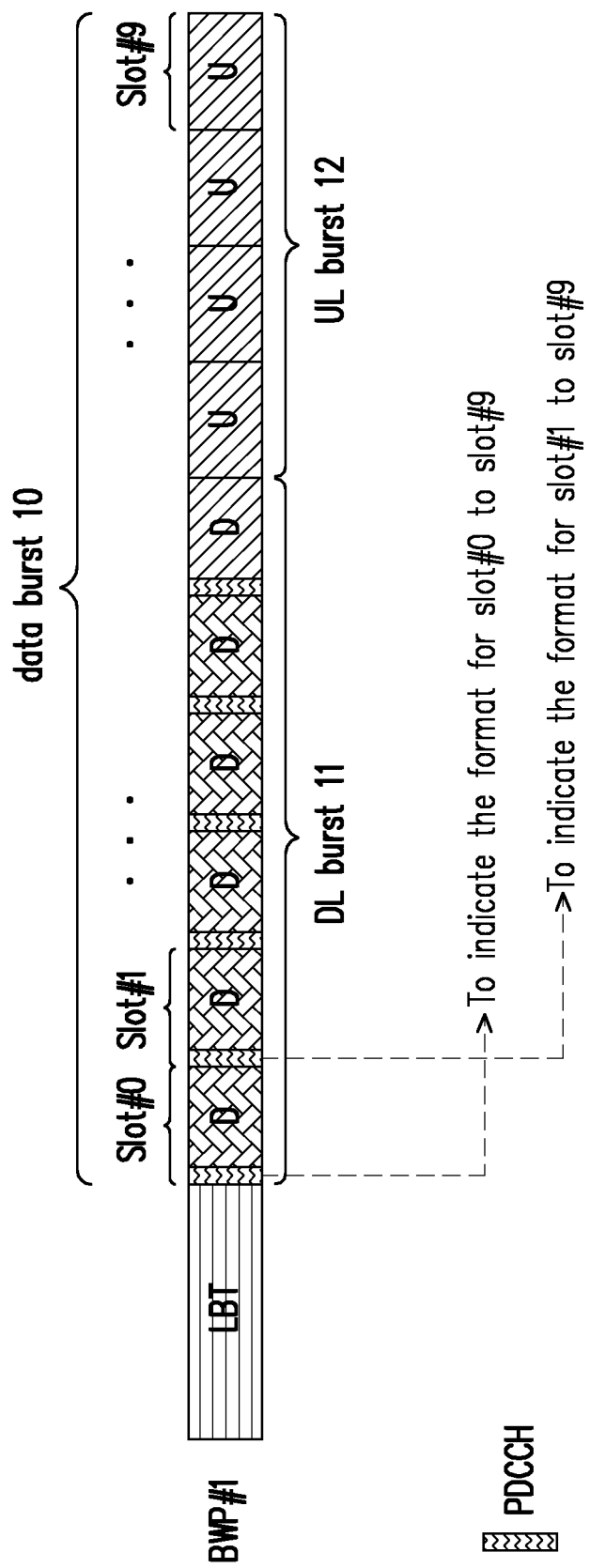
FIG. 1 is a schematic diagram of a data burst transmitted via a BWP in a unlicensed band.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

Reference will now be made in detail to the embodiments of the disclosure, examples of which are illustrated in the accompanying drawings. Wherever possible, the same reference numbers are used in the drawings and the description to refer to the same or like parts.

The term "base station" (BS) in this disclosure could be synonymous, for example, with a variation or a sub-variation of a cell, a serving cell, a "gNodeB" (gNB), an "eNodeB" (eNB), a Node-B, an advanced BS (ABS), a transmission reception point (TRP), an unlicensed cell, an unlicensed serving cell, an unlicensed TRP, a base transceiver system (BTS), an access point, a home BS, a relay station, a scatterer, a repeater, an intermediate node, an intermediary, satellite-based communication BSs, and so forth.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

FIG. 3 is a schematic diagram of a communication system 1 according to an embodiment of the disclosure. Referring to FIG. 3, the communication system 1 includes at least, but not limited to, a UE 100 and a BS 200. The UE 100 and the BS 200 use a mobile (or cellular) communication network (e.g., 4G, 5G, or a higher generation mobile network). In an embodiment, the UE 100 and the BS 200 may communicate with each other by an unlicensed band.

Figure 4:
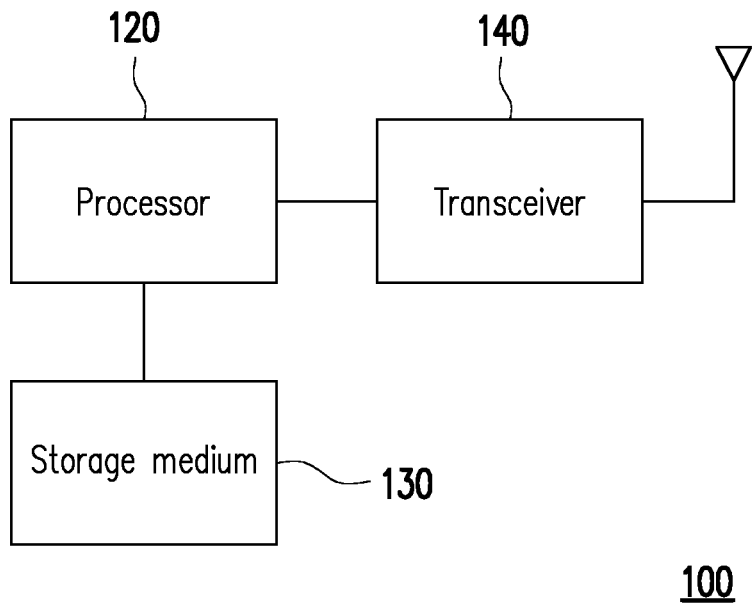
FIG. 4 is a block diagram of user equipment according to an embodiment of the disclosure.

FIG. 4 is a block diagram of the user equipment 100 according to an embodiment of the disclosure. Referring to FIG. 4, the UE 100 may include at least (but not limited to) a processor 120, a storage medium 130 and a transceiver 140.

The processor 120 is, for example, a Central Processing Unit (CPU), or other programmable general purpose or special purpose microprocessor, a Digital Signal Processor (DSP), a programmable controller, an Application Specific Integrated Circuit (ASIC), a Graphics Processing Unit (GPU) or other similar components or a combination of the above components. The processor 120 is configured to perform a method for downlink reception in unlicensed band which will be described afterward.

The storage medium 130 is coupled to the processor 120, and is, for example, any type of a fixed or movable Random Access Memory (RAM), a Read-Only Memory (ROM), a flash memory, a Hard Disk Drive (HDD), a Solid State Drive (SSD), or similar components or a combination of the above components. The storage medium 130 stores a plurality of modules or programs for the processor 120 to access, such that the processor 120 may execute various communication functions of the UE 100.

The transceiver 140 is coupled to the processor 120. The transceiver 140 may receive a DL signal and transmit a UL signal. The transceiver 140 may execute operations of Low Noise Amplifying (LNA), impedance matching, analog-to-digital (ADC) converting, digital-to-analog (DAC) converting, frequency mixing, up-down frequency conversion, filtering, amplifying and/or similar operations. The transceiver 140 may further includes an antenna array, and the antenna array may include one or a plurality of antennas for transmitting and receiving omnidirectional antenna beams or directional antenna beams.

Figure 5:
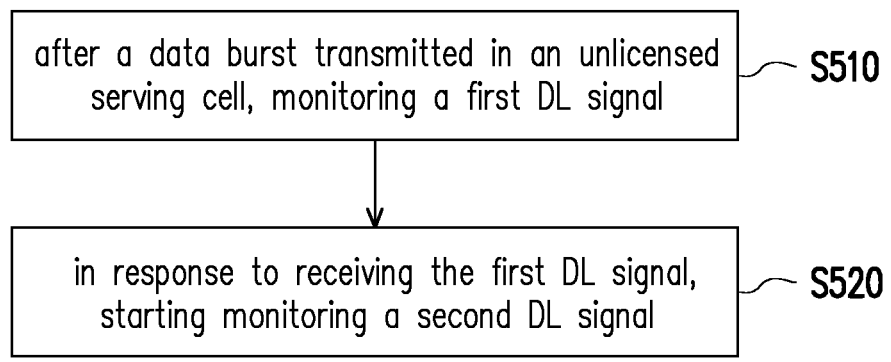
FIG. 5 is a flowchart of a method for downlink reception in unlicensed band according to an embodiment of the disclosure.

FIG. 5 is a flowchart of a method for downlink reception in an unlicensed band according to an embodiment of the disclosure. Referring to FIG. 5, the method of this embodiment is adapted for the UE 100 and the BS 200 under the communication system 1 of FIG. 3. In the following paragraphs, the method of this embodiment is described first with reference to the components and modules of the UE 100. Nevertheless, the processes of this method may be adjusted according to the actual needs and thus are not limited to the following.

In step S510, after a data burst transmitted in an unlicensed serving cell, the UE 100 may monitor a first DL signal. Herein, the data burst is transmitted via a BWP (i.e., a first BWP), and the data burst is initiated by the BS 200. The BS 200 may apply a channel access procedure (e.g. LBT procedure) before transmitting the data burst. In an embodiment, a BWP may include at least one contiguous PRB in frequency domain. A BWP may include at least one sub-band, and a sub-band may refer to part of a BWP or whole BWP, a frequency range, at least one PRB, etc. A sub-band size may be a fixed value or determined according to higher layer signalling. In an embodiment, the data burst may include a DL data burst and/or a UL data burst, which is not limited in the disclosure. The DL data burst is defined as a set of successive transmissions from a given BS 200 (e.g., gNB), wherein the gap between the two adjacent transmissions in one DL data burst may not be more than a time duration, which is 16 μs. That is, the DL transmission burst is defined as a set of transmissions from the BS 200 without any gaps greater than the time duration, and transmissions from the given BS 200 having a gap which is more than 16 μs may be considered as two separate DL bursts. On the other hand, the UL data burst is defined as a set of successive transmissions from a given UE 100, wherein the gap between the two adjacent transmissions in one UL data burst may not be more than a time duration which is 16 μs. That is, the UL transmission burst is defined as a set of transmissions from the UE 100 without any gaps greater than the time duration, and transmissions from the given UE 100 having a gap which is more than 16 μs may be considered as two separate UL bursts. It should be noted that, the DL/UL resource of the data burst is indicated by a DCI, and the length or the end of the data burst is indicated by a DCI.

In an embodiment, after the data burst, the UE 100 may monitor a first DL signal. The first DL signal includes a DL reference signal or a DCI. In an embodiment, after the data burst, the UE 100 may monitor a first DL signal and stop monitoring a second DL signal since a specific slot/symbol. The specific slot/symbol may be assigned by the BS 200 or may be predetermined. In an embodiment, since the information of the data burst (e.g. how many slots the data burst has or the ending slot of the data burst) may be indicated to the UE 100 by the BS 200, the UE 100 may know when to stop monitoring a second DL signal. Namely, the UE 100 may stop receiving at least one DL signal related to data burst transmission via PDCCH after the data burst transmitted via the BWP in the unlicensed band, and the at least one DL signal related to the data burst transmission may include a DCI and/or a reference signal. In an embodiment, the UE 100 may power off some electronic components to stop monitoring the at least one DL channel.

Next, in step S520, in response to receiving the first DL signal, the UE 100 may start monitoring a second DL signal. In one embodiment, in response to receiving the first DL signal, the UE 100 may start monitoring the second DL signal and stop monitoring the first DL signal. That is, after the UE stops monitoring the second DL signal, the UE may resume monitoring the second DL signal due to a specific condition is fulfilled. The specific condition for resuming monitoring the second DL signal may include reception of a reference signal. That is, in an embodiment, after the UE 100 stops monitoring the second DL signal, the UE 100 may start monitoring the second DL signal in response to receiving a reference signal form the BS 200. Such that, during a time interval between the separate data bursts, the operation of monitoring the second DL signal may be suspended for a while to reduce power consumption. It should be noted that, the second DL signal may be a UE-specific DCI, a common DCI, a group-common DCI, a DCI in UE-specific search space, or a DCI in common search space.

Figure 6:
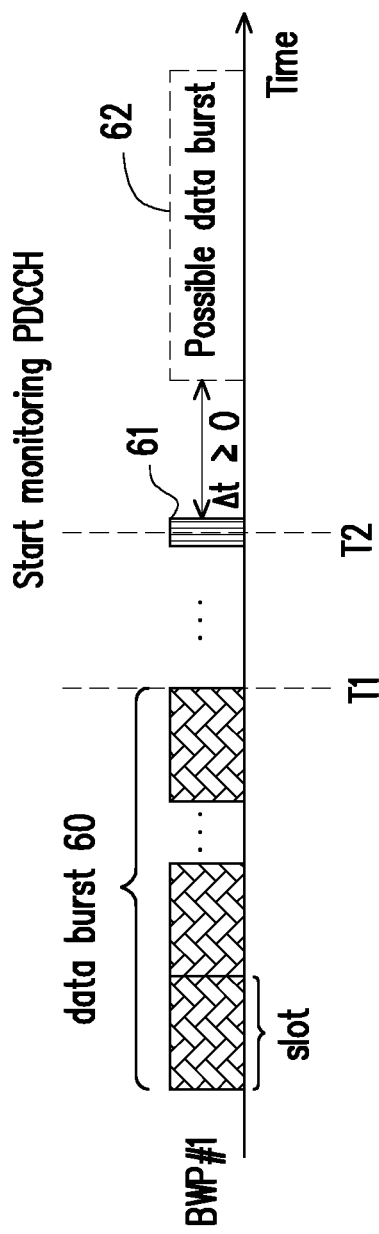
FIG. 6 is a schematic diagram of stopping monitoring a downlink channel until a reference signal is received according to an embodiment of the disclosure.

FIG. 6 is a schematic diagram of stopping monitoring a downlink channel until a reference signal is received according to an embodiment of the disclosure. Referring to FIG. 6, after the data burst 60 transmitted via BWP #1 in an unlicensed band, the UE 100 may stop monitoring PDCCH from the time point T1. That is, the UE 100 may not perform PDCCH blind detection from the time point T1. In an embodiment, the UE 100 may keep detecting at least one reference signal (i.e., first DL signal) after the data burst 60. Hence, in response to receiving the reference signal 61 at time point T2, the UE 100 may start monitoring PDCCH (i.e., second DL signal) for the next possible data burst 62. The reference signal 61 may be a reference signal for channel measurement, a reference signal for channel tracking or a reference signal for adjusting automatic gain control (AGC), and so on. For example, the reference signal 61 may include a primary synchronization signal (PSS), a second synchronization signal (SSS), a demodulation reference signal (DMRS), a physical broadcast channel (PBCH), a channel status information reference signal (CSI-RS), a wake-up signal of discontinuous reception (DRX) mechanism, group common physical downlink control channel (GC-PDCCH), or preamble. The said preamble may be a Wi-Fi beacon for example. That is, after the UE 100 resumes monitoring PDCCH from the time point T2, the UE 100 may detect the next possible data burst 62 by monitoring PDCCH, so as to perform transmission of the next possible data burst 62 with the BS 200. The time gap Δt between the reference signal 61 and the next possible data burst 62 could be a fixed value or determined according to the reference signal 61 or a higher layer signal.

In an embodiment, after the data burst 60, the UE 100 may keep detecting at least one first reference signal but stop detecting at least one second reference signal from the time point T1. Once the UE 100 receives first reference signal, the UE 100 may resume to monitoring the second reference signal. The first reference signal is different from the second reference signal. For example, the first reference signal may belong to first search space group and the second reference signal may belong to second search space group. Therefore, the power consumption of UE 100 may be decreased due to stopping detecting the second reference signal from the time point T1 to the time point T2.

In an embodiment, the UE 100 may receive a configuration signal comprising time-domain information of a time period configured by the BS 200, and the time-domain information of the time period indicates a time duration of the time period. The time period is more than 0 (ms). The time-domain information in the configuration signal may be the number of slots (e.g., X slots) or an absolute time duration (e.g., Y ms). Besides, in the disclosure, the time period during which the UE 100 stops monitoring the downlink channel (i.e. second DL signal) may be also referred to as a "frozen block." That is, "frozen block" may be a time period in which the UE 100 may not receive some downlink service.

Figure 7:
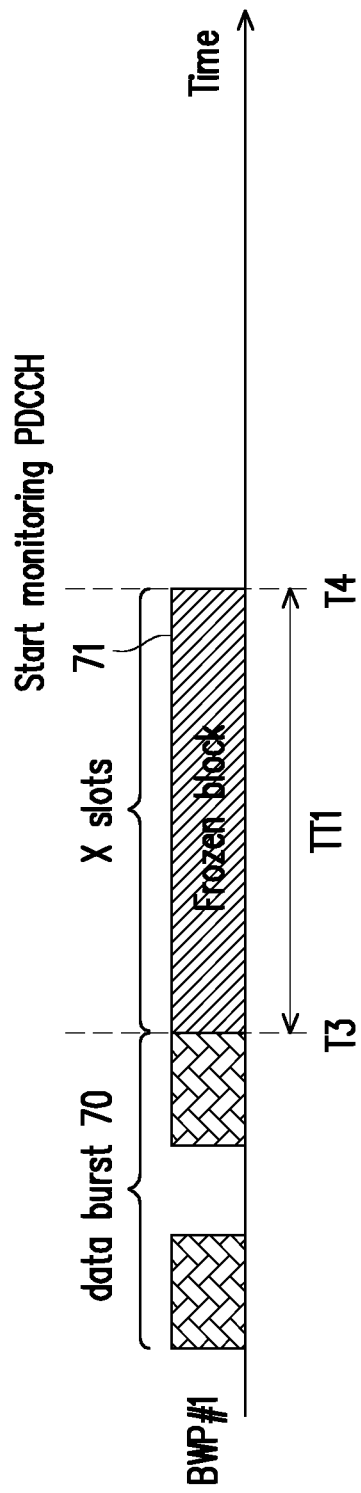
FIG. 7 is a schematic diagram of stopping monitoring a downlink channel until expiration of a time period according to an embodiment of the disclosure.

FIG. 7 is a schematic diagram of stopping monitoring a downlink channel until expiration of a time period according to an embodiment of the disclosure. Referring to FIG. 7, the BS 200 may configure a time period for the UE 100, so that the UE 100 may stop monitoring the downlink channel during the configured time period TT1 after the data burst 70 transmitted via BWP #1 in an unlicensed band. In an embodiment, the UE 100 may receive a configuration signal comprising time-domain information of the time period TT1.

In FIG. 7, the time period TT1 during which the UE 100 stops monitoring whole PDCCH or part of PDCCH is also referred to as a frozen block 71, wherein the time period TT1 is configured by the BS 200. The frozen block 71 on the BWP #1 may include X slots (X 1), and the number of the slots in the frozen block 71 is configured by the BS 200. In response to ending of the data burst 70 at the time point T3, the UE 100 may stop monitoring the downlink channel within the frozen block 71 which is from the time point T3 to the time point T4. That is, in response to expiration of the time period TT1 at time point T4, the UE 100 may resume monitoring the downlink channel, which may be whole PDCCH or part of PDCCH. In an embodiment, the time point T3 is indicated by the BS 100 via transmitting the configuration signal, and the UE 100 may be informed with when to stop monitoring the DL channel through the configuration signal transmitted by the BS 200.

In an embodiment, after the data burst 70 transmitted in the unlicensed band, in addition to that PDCCH is not monitored by the UE 100 during the time period TT1, the UE 100 may stop monitoring at least one reference signal during the time period TT1. The reference signal(s) being stopped monitoring during the time period TT1 by the UE 100 may include PSS, SSS, DMRS, PBCH, CSI-RS, wake-up signal, or preamble. In response to expiration of the time period TT1 at the time point T4, the UE 100 may resume monitoring the reference signal(s). For example, the radio frequency (RF) components of the UE 100 may be powered off during the time period TT1 to stop monitoring the downlink channel and the reference signals. In response to expiration of the time period TT1, the UE 100 may power on the RF components to resume monitoring the DL channel and the reference signal(s).

Figure 8:
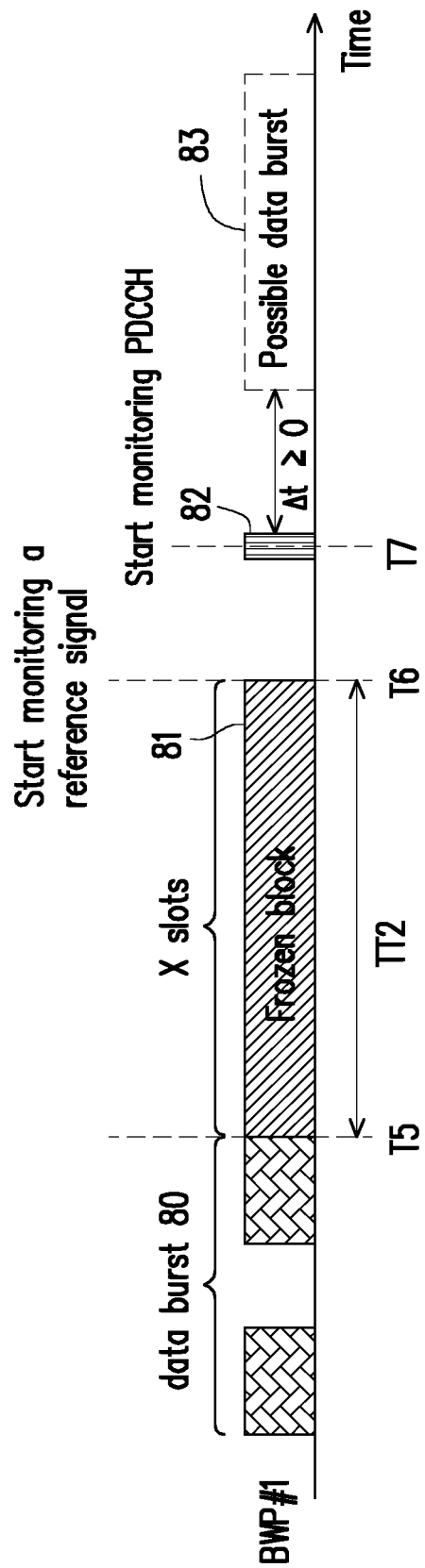
FIG. 8 is a schematic diagram of stopping monitoring a downlink channel until a reference signal is received according to an embodiment of the disclosure.

FIG. 8 is a schematic diagram of stopping monitoring a downlink channel until a reference signal is received according to an embodiment of the disclosure. Referring to FIG. 8, the BS 200 may configure a time period for the UE 100, so that the UE 100 may stop monitoring both a downlink channel and a reference signal during the configured time period TT2 after the data burst 80 transmitted via BWP #1 in an unlicensed band. In an embodiment, the UE 100 may receive a configuration signal comprising time-domain information of the time period TT2.

In response to ending of the data burst 80 at the time point T5, the UE 100 may stop monitoring the downlink channel and the reference signal within the frozen block 81 which is from time point T5 to time point T6. In response to expiration of the time period TT2 at time point T6, the UE 100 may resume monitoring the reference signal, such as PSS, SSS, DMRS, PBCH, CSI-RS, wake-up signal, or preamble, but still stop monitoring the downlink channel. That is, the UE 100 may start monitoring the reference signal after the time period TT2. Next, in response to receiving the reference signal 82 at the time point T7, the UE 100 may start monitoring the downlink channel. That is, from the time point T6 to T7, the UE 100 stops monitoring the downlink channel but resume monitoring at least one reference signal.

Namely, the UE 100 may not perform PDCCH blind detection from the time point T5 to t7. In an embodiment, the time point T5 is indicated by the BS 100 via transmitting the configuration signal, and the UE 100 may be informed with when to stop monitoring the DL channel through the configuration signal transmitted by the BS 200. In response to receiving the reference signal 82 at time point T7, the UE 100 may start monitoring PDCCH to perform PDCCH blind detection for the next possible data burst 83. The reference signal 82 may be a reference signal for channel measurement, a reference signal for channel tracking or a reference signal for adjusting AGC, and so on. That is, after the UE 100 resumes monitoring PDCCH at time point T7, the UE 100 may detect the next possible data burst 83 by monitoring PDCCH so as to perform transmission of the next possible data burst 83 with the BS 200. The time gap Δt between the reference signal 82 and the next possible data burst 83 could be a fixed value or determined according to the reference signal 82 or a higher layer signal.

In an embodiment, the frozen block information of the frozen block, such as the frozen block 71 and 81 in FIG. 7 and FIG. 8, is configured by the BS 200, and the UE 100 is informed with the frozen block information by the BS 200 through the configuration signal. The frozen block information of the frozen block may include time-domain information indicating the time duration of the frozen block and frequency-domain information indicating BWP switching information. The configuration signal may include a radio resource control (RRC) configuration signal, a medium access control (MAC) control element (CE), a downlink control information (DCI) or a combination thereof. That is, the BS 200 may notice the UE 100 of the time duration of the frozen block by a physical layer signal and/or a higher layer signal.

In an embodiment, the UE 100 may determine the time-domain information of the frozen block in response to detecting a common DCI, a group-common DCI, or a UE-specific DCI. Namely, the UE 100 may determine the time-domain information of the frozen block according to the detected DCI in common search space or in UE-specific search space.

In an embodiment, the time duration of the frozen block is configured by the BS 200 transmitting the configuration signal, and the configuration signal includes the time-domain information of the frozen block. In an embodiment, the configuration signal indicating the time duration of the frozen block may include a first signal and a second signal. The first signal indicates at least one candidate time duration, and the second signal indicates the time duration of the time period from the at least one candidate time duration. The second signal may be a physical layer signal and the first signal may be a higher layer signal. In an embodiment, the first signal may be a RRC configuration signal, and the second signal may be a DCI.

Figure 9:
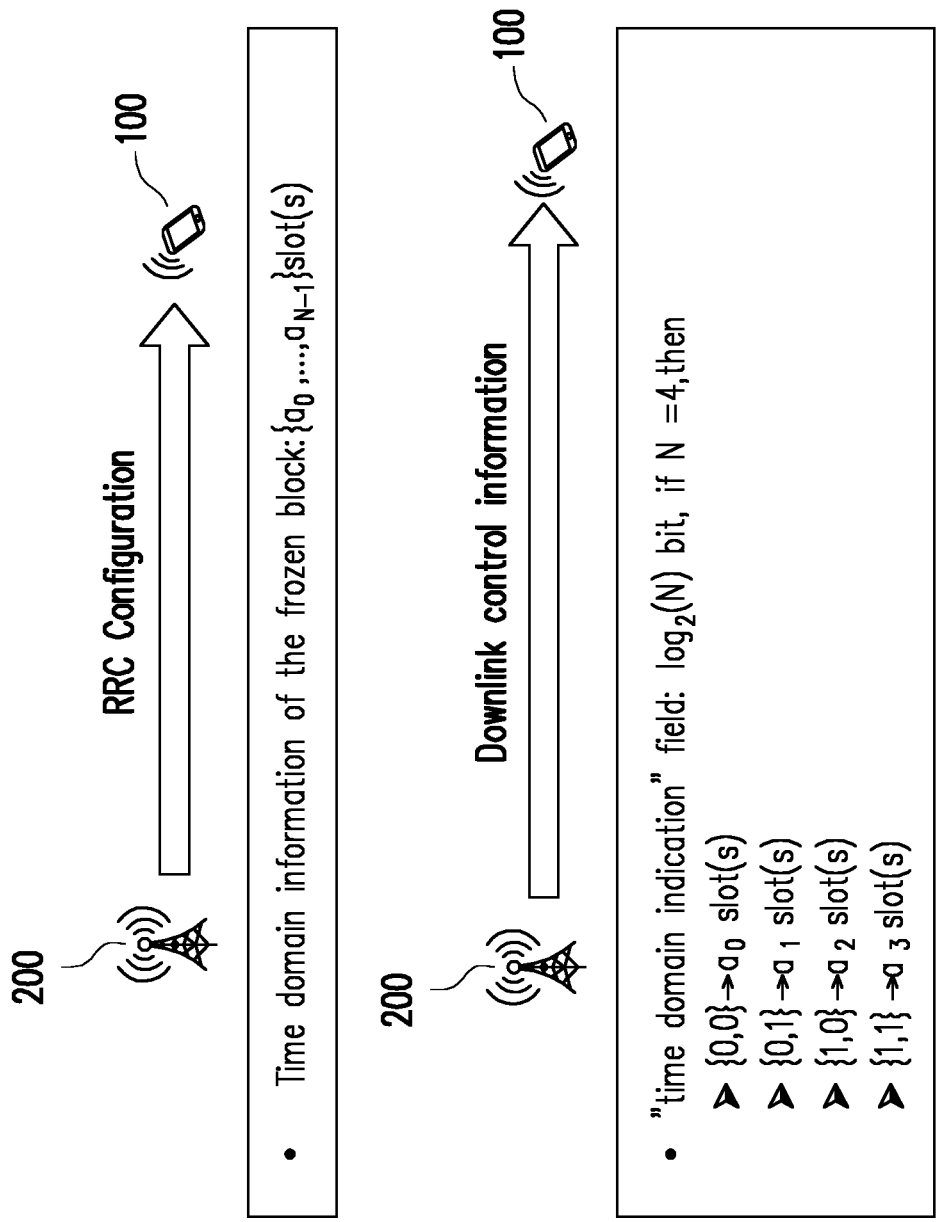
FIG. 9 is a schematic diagram of indicating the time duration of the frozen block by the configuration signal according to an embodiment of the disclosure.

FIG. 9 is a schematic diagram of indicating the time duration of the frozen block by the configuration signal according to an embodiment of the disclosure. Referring to FIG. 9, the BS 200 may transmit a RRC configuration signal indicating N (N≥1) candidate time durations $\{a_0, a_1, a_2, \ldots, a_{N-1}\}$ (unit: slots) to the UE 100. Next, the BS 200 may transmit a DCI indicating the time duration of the frozen block from the candidate time durations $\{a_0, a_1, a_2, \ldots, a_{N-1}\}$, wherein the DCI at least includes $\log_2$ N bits. Assuming that N=4, the DCI indicating the time duration of the frozen block may include 2 bits, which is $\{\{0,0\}, \{0,1\}, \{1,0\}, \{1,1\}\}$. If the UE 100 receives the DCI which is $\{0, 0\}$, then the UE 100 may be configured to set the time duration of the frozen block as $a_0$ slots. If the UE 100 receives the DCI which is $\{0, 1\}$, then the UE 100 may be configured to set the time duration of the frozen block as $a_1$ slots. If the UE 100 receives the DCI which is $\{1, 0\}$, then the UE 100 may be configured to set the time duration of the frozen block as $a_2$ slots. If the UE 100 receives the DCI which is $\{1,1\}$, then the UE 100 may be configured to set the time duration of the frozen block as $a_3$ slots.

It should be noted that, the time duration of the frozen block may be determined according to the numerologies of the BWP. In an embodiment, the time duration of the frozen block may be determined according to a predetermined SCS or a subcarrier spacing (SCS) of the BWP, such as an active BWP, a default BWP or an initial BWP. In one embodiment, if the BS 200 assign an absolute time duration (milliseconds (ms)) of the frozen block to the UE 100, the UE 100 may need to convert the absolute time duration to the number of slots according to the numerologies of the BWP (e.g. BWP #1 in FIG. 7).

Figure 10:
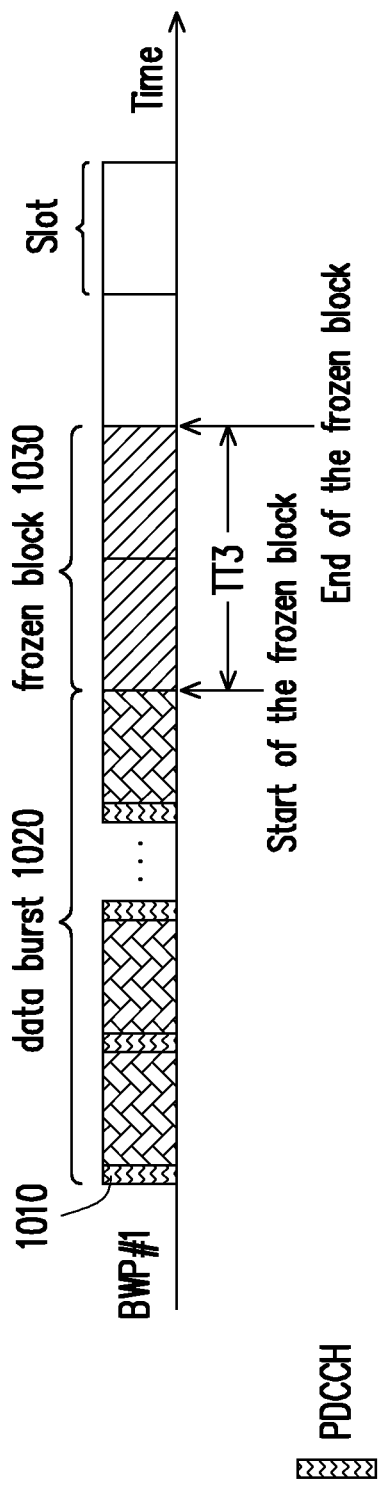
FIG. 10 is a schematic diagram of indicating the time duration of the frozen block by the configuration signal according to an embodiment of the disclosure.

FIG. 10 is a schematic diagram of indicating the time duration of the frozen block by the configuration signal according to an embodiment of the disclosure. Referring to FIG. 10, the UE 100 may determine the frozen block information including time-domain information according to a detected common PDCCH 1010. For example, the UE 100 may receive a RRC configuration signal including 4 candidate time durations $\{0, 2, 5, 10\}$ (unit:slots). In FIG. 10, in response to the UE 100 decodes the common PDCCH 1010 and accordingly obtains the DCI indicating the time-domain information of the frozen block 1030 from the common PDCCH 1010, the UE 100 may be informed with that the time duration of the frozen block 1030 is 2 slots due to the DCI including $\{0,1\}$. Hence, after the data burst 1020, the UE 100 may stop monitoring a DL channel within the time period TT3 which is 2 slots. In one embodiment, the frozen block 1030 may be started from a slot or a symbol indicated by the BS 200.

In an embodiment, the frozen block information may further include frequency-domain information of the frozen block. The frequency-domain information of the frozen block is configured by the BS 200 transmitting the configuration signal, and the configuration signal includes the frequency-domain information of the time period during which the UE 100 stops monitoring a DL channel. The frequency-domain information of the frozen block indicates BWP switching information (e.g., BWP ID). Specifically, the UE 100 may determine whether to perform a BWP switching procedure according to the frequency-domain information of the frozen block. The BWP switching procedure is used to activate an inactive BWP and deactivate an active BWP at a time. In an embodiment, the UE 100 may perform a BWP switching procedure to switch to a second BWP from a first BWP according to the BWP switching information during the time period configured by the BS 200. That is, the UE 100 may activate the second BWP and deactivate the first BWP according to the BWP switching information indicating the second BWP.

In an embodiment, the UE 100 may obtain the frequency-domain information of the frozen block in response to detecting a common DCI, a group-common DCI, or a UE-specific DCI. Namely, the UE 100 may obtain the BWP switching information according to the detected DCI in common search space or in UE-specific search space. In an embodiment, the configuration signal indicating the frequency-domain information of the frozen block may include a first signal and a second signal. The first signal indicates at least one candidate BWP, and the second signal indicates the target BWP (i.e. the second BWP) from the at least one candidate BWP. The second signal may be a physical layer signal and the first signal may be a higher layer signal. In an embodiment, the first signal may be a RRC configuration signal, and the second signal may be a DCI.

Figure 11:
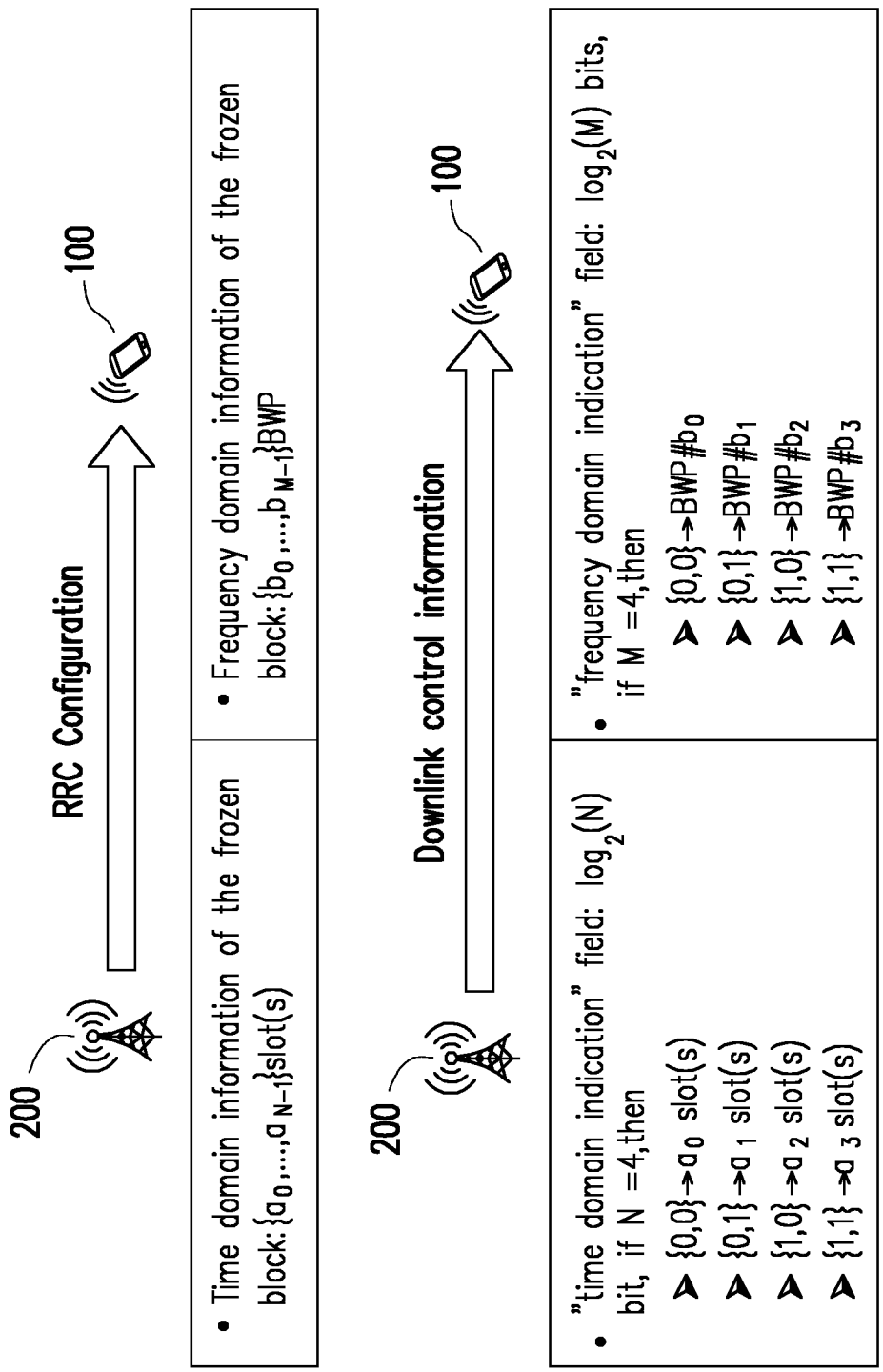
FIG. 11 is a schematic diagram of indicating the time duration and the BWP switching information of the frozen block by the configuration signal according to an embodiment of the disclosure.

FIG. 11 is a schematic diagram of indicating the time duration and the BWP switching information of the frozen block by the configuration signal according to an embodiment of the disclosure. Referring to FIG. 11, the UE 100 may be informed with the time-domain information of the frozen block by the BS 200 through a RRC configuration signal and a DCI, which is similar with FIG. 9 and would not be described repeatedly. It should be noted that, the BS 200 may transmit the RRC configuration signal indicating M (M≥1) candidate BWPs $\{b_0, b_1, b_2, \ldots, b_{M-1}\}$ to the UE 100. Next, the BS 200 may transmit the DCI indicating the target BWP from the candidate BWPs $\{b_0, b_1, b_2, \ldots, b_{M-1}\}$, wherein the DCI at least includes $\log_2$ M bits. Assuming that M=4, the DCI indicating the target BWP may include 2 bits, which may be $\{\{0,0\}, \{0,1\}, \{1,0\}, \{1,1\}\}$. If the UE 100 receives the DCI which is $\{0, 0\}$, then the UE 100 may be configured to switch to the target BWP having the BWP ID #$b_0$ within the frozen block. If the UE 100 receives the DCI which is $\{0, 1\}$, then the UE 100 may be configured to switch to the target BWP having the BWP ID #$b_1$ within the frozen block. If the UE 100 receives the DCI which is $\{1, 0\}$, then the UE 100 may be configured to switch to the target BWP having the BWP ID #$b_2$ within the frozen block. If the UE 100 receives the DCI which is $\{1,1\}$, then the UE 100 may be configured to switch to the target BWP having the BWP ID #$b_3$ within the frozen block.

Figure 12:
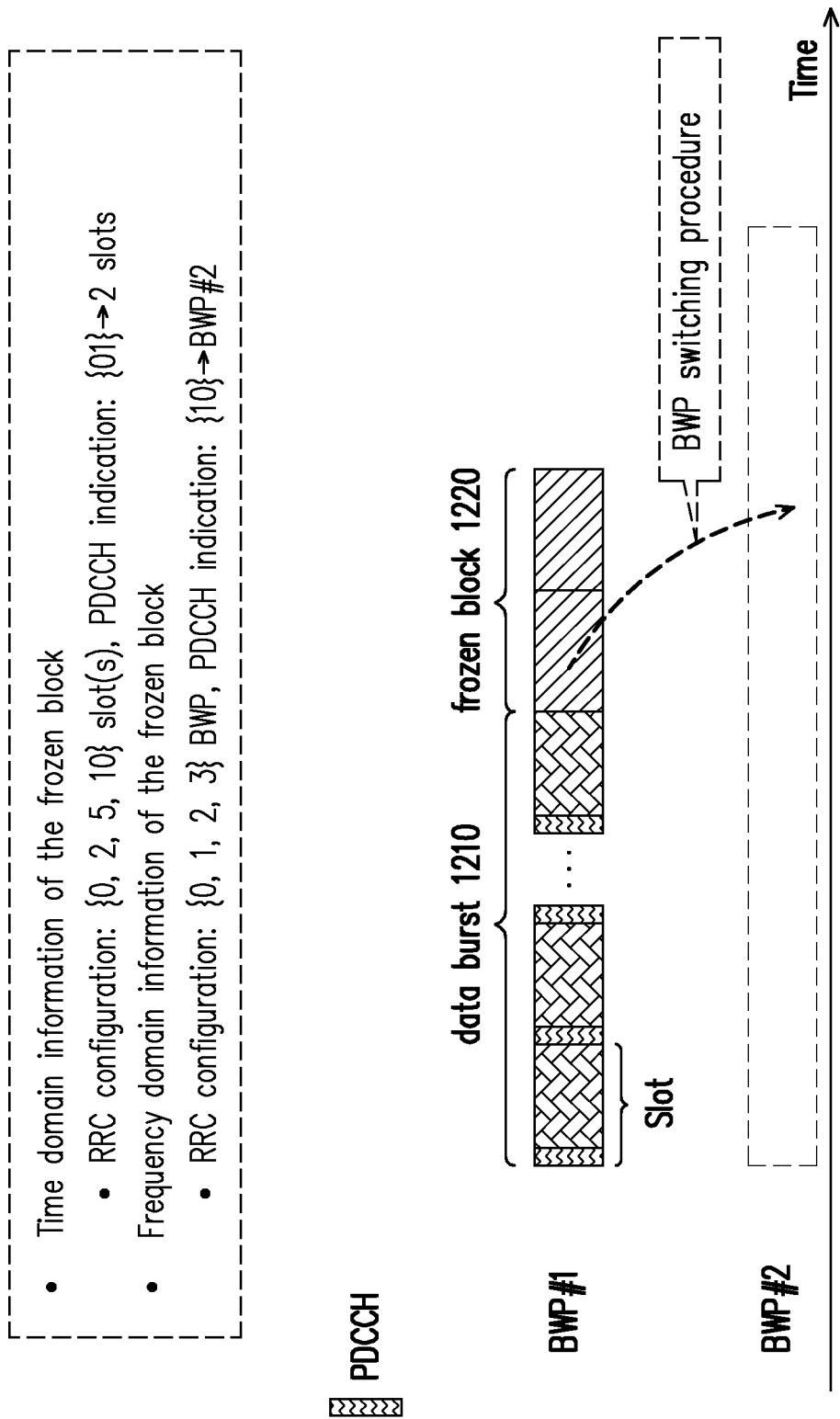
FIG. 12 is a schematic diagram of a BWP switching procedure according to an embodiment of the disclosure.

FIG. 12 is a schematic diagram of a BWP switching procedure according to an embodiment of the disclosure. Referring to FIG. 11, the UE 100 may receive a RRC configuration signal including 4 candidate time durations $\{0, 2, 5, 10\}$ (unit: slots). The UE 100 may be informed with that the time duration of the frozen block 1220 is 2 slots due to a DCI including {0,1} in the decoded PDCCH. Hence, after the data burst 1210, the UE 100 may stop monitoring a DL channel. Besides, the UE 100 may receive the RRC configuration signal including 4 candidate BWPs {#0, #1, #2, #3}, and the UE 100 may be informed with that the BWP switching information indicating a BWP #2 due to a DCI including {1,0} in the decoded PDCCH. Therefore, the UE 100 may perform a BWP switching procedure from BWP #1 to BWP #2 within the frozen block 1220. In an embodiment, if the BWP switching condition is fulfilled within the frozen block 1220, the UE may perform a BWP switching procedure from BWP #1 to BWP #2 indicating by the decoded DCI including {1,0}. For example, when a BWP inactivity timer is expired within the frozen block 1220, the UE may perform a BWP switching procedure from BWP #1 to BWP #2.

In one embodiment, within the frozen block, the UE 100 may perform a channel state measurement during the time period while stopping monitoring the downlink channel. The channel state measurement may include RSSI measurement and/or channel occupancy rate (ORC) determination, which is not limited in the disclosure. Specifically, within the frozen block, the UE 100 may receive the reference signal for channel measurement from the other base stations.

In an embodiment, a frozen block may include at least one whole slot or at least one partial slot, and part of the at least one slot is allocated for UL configured grant (grant-free) transmission. Specifically, each slot in the frozen block may be numbered in order, e.g. slot #0 to slot #X−1. Namely, the frozen block may include X slots. In an embodiment, the slot(s) configured for UL transmission within the frozen block may be determined according to a predetermined pattern. For example, the third slot which is numbered as slot #2 may be configured for UL configured grant transmission in the predetermined pattern. Alternatively, in an embodiment, the BS 200 may assign some slots within the frozen block to the UE 100 for UL transmission by transmitting a configuration signal, and the configuration signal may be a physical layer signal or a higher layer signal. That is, the UE 100 may receive a configuration signal indicating the part of the at least one slot of the frozen block, and then the UE 100 may transmit the UL configured grant transmission via the part of the at least one slot of the frozen block during the time period. In one embodiment, the configuration signal transmitted by the BS 200 and indicating the slot(s) for UL configured grant transmission may include a periodicity parameter and a shift parameter, and the periodicity parameter and the shift parameter is used to determine some specific slot(s) within the frozen block for UL configured grant transmission.

Figure 13:
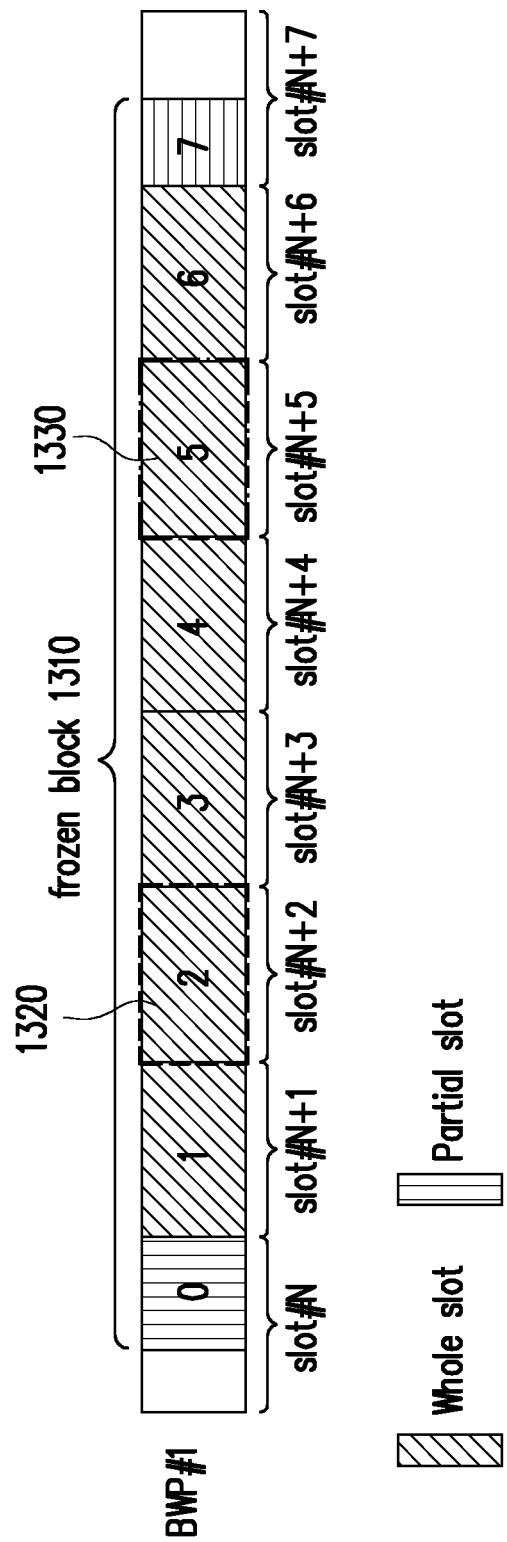
FIG. 13 is a schematic diagram of indicating some slots within the frozen block for UL transmission according to an embodiment of the disclosure.

For example, FIG. 13 is a schematic diagram of indicating some slots within the frozen block for UL transmission according to an embodiment of the disclosure. In FIG. 13, there are 8 slots in the frozen block 1310 on BWP #1 and numbered from 0 to 7, wherein the first slot and the last slot within the frozen block 1310 are partial slots. If the UE 100 receives the configuration signal including a periodicity parameter which is 4 (P=4) and a shift parameter which is 1 (S=1), the UE 100 may determine that slot #1 1320 and slot #5 1330 within the frozen block 1310 are allocated for UL grant transmission according to the periodicity parameter and the shift parameter. Herein, the numbering NL of the slot allocated for UL grant transmission is determined according to the periodicity parameter P, the shift parameter S and the following formula(1).

$$NL = n + S, \text{ if } n \bmod P = 0 \qquad \text{formula(1)}$$

wherein n is the numbering of the slot within the frozen block. In FIG. 13, the slot #1 1320 and slot #5 1330 within the frozen block 1310 are determined for UL grant transmission since P=4 and S=1. In another example, if P=3 and S=1, the UE 100 may be informed with that slot #1, slot #4 and slot #7 within the frozen block 1310 are allocated for UL grant transmission.

In one embodiment, the resource including time domain resource or frequency domain resource within a slot allocated for UL grant transmission may be determined by the UE 100 according to a predetermined pattern or a resource configuration signal, such as a physical layer signal or a higher layer signal. Take the slot #1 1320 and the slot #5 1330 within the frozen block 1310 in FIG. 13 for example, resource configurations of the slot #1 1320 and the slot #5 1330 may be identical or different, wherein the resource configurations of the slot #1 1320 and the slot #5 1330 may indicate which symbols or PRBs in the slot #1 1320 and the slot #5 1330 are configured for UL grant transmission.

In an embodiment, when the UE 100 is activated on the first BWP, a BWP inactivity timer is started to time the activation time of the first BWP. The BWP inactivity timer is used by the UE 100 to deactivate a BWP in an activated state, and expiration of the BWP inactivity timer is configured for triggering a BWP switching procedure. In response to that the BWP inactivity timer expires, a corresponding BWP needs to be deactivated. That is, the UE 100 may determine whether the BWP in the activated state needs to be deactivated according to the timing duration of the first timer. Namely, if the BWP inactivity timer corresponding to the first BWP is expired, the UE 100 may perform a BWP switching procedure from the first BWP to the second BWP. The second BWP may be a default BWP, an initial BWP, or a BWP configured by the BS through the configuration signal. The BWP inactivity timer may be started or restarted by the UE 100 upon receiving an UE-specific DCI from PDCCH.

In an embodiment, after the data burst transmitted in the unlicensed band, the UE 100 may suspend a BWP inactivity timer corresponding to the first BWP in response to ending of the data burst. In response to receiving the reference signal or in response to expiration of a time period (i.e. frozen block), the UE 100 may resume the BWP inactivity timer corresponding to the first BWP.

Figure 14:
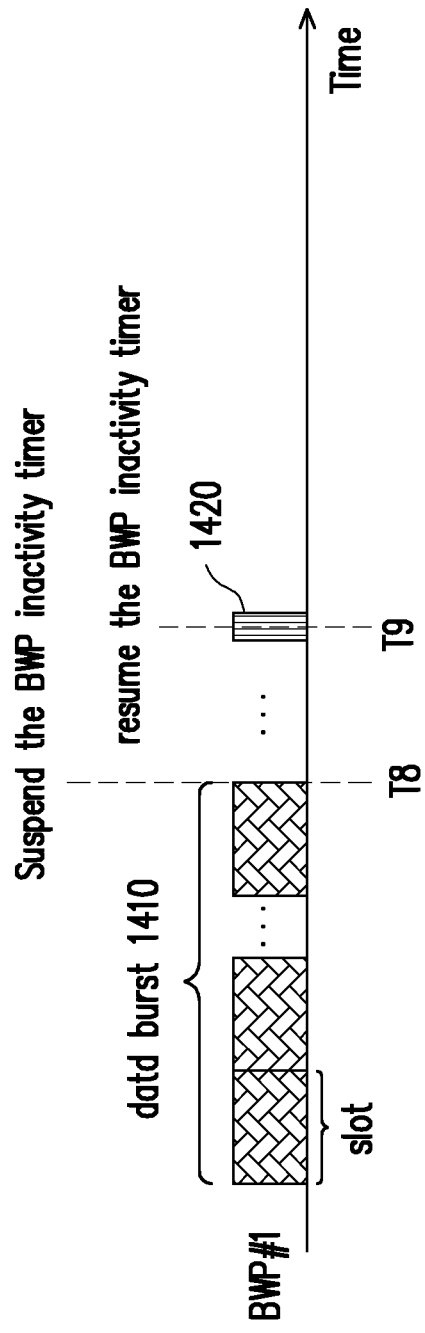
FIG. 14 is a schematic diagram of suspending and resuming a BWP inactivity timer according to an embodiment of the disclosure.

FIG. 14 is a schematic diagram of suspending and resuming a BWP inactivity timer according to an embodiment of the disclosure. Referring to FIG. 14, since the UE 100 is on the BWP #1 which is activated, the BWP inactivity timer corresponding to the BWP #1 is used for timing the activation time of the BWP #1. After the data burst 1410, the UE 100 may suspend the BWP inactivity timer corresponding to the BWP #1 in response to the ending of the data burst 1410 at the time point T8. After the time point T8, the UE 100 may keep monitor a reference signal, such as PSS, SSS, DMRS, PBCH, CSI-RS, wake-up signal, or preamble. Upon receiving the reference signal 1420 at the time point T9, the UE may resume the BWP inactivity timer, such that the BWP inactivity timer may keep running after the time point T9. In an embodiment, the reference signal may be configured with a periodicity or a time shift.

Figures 15, 16:
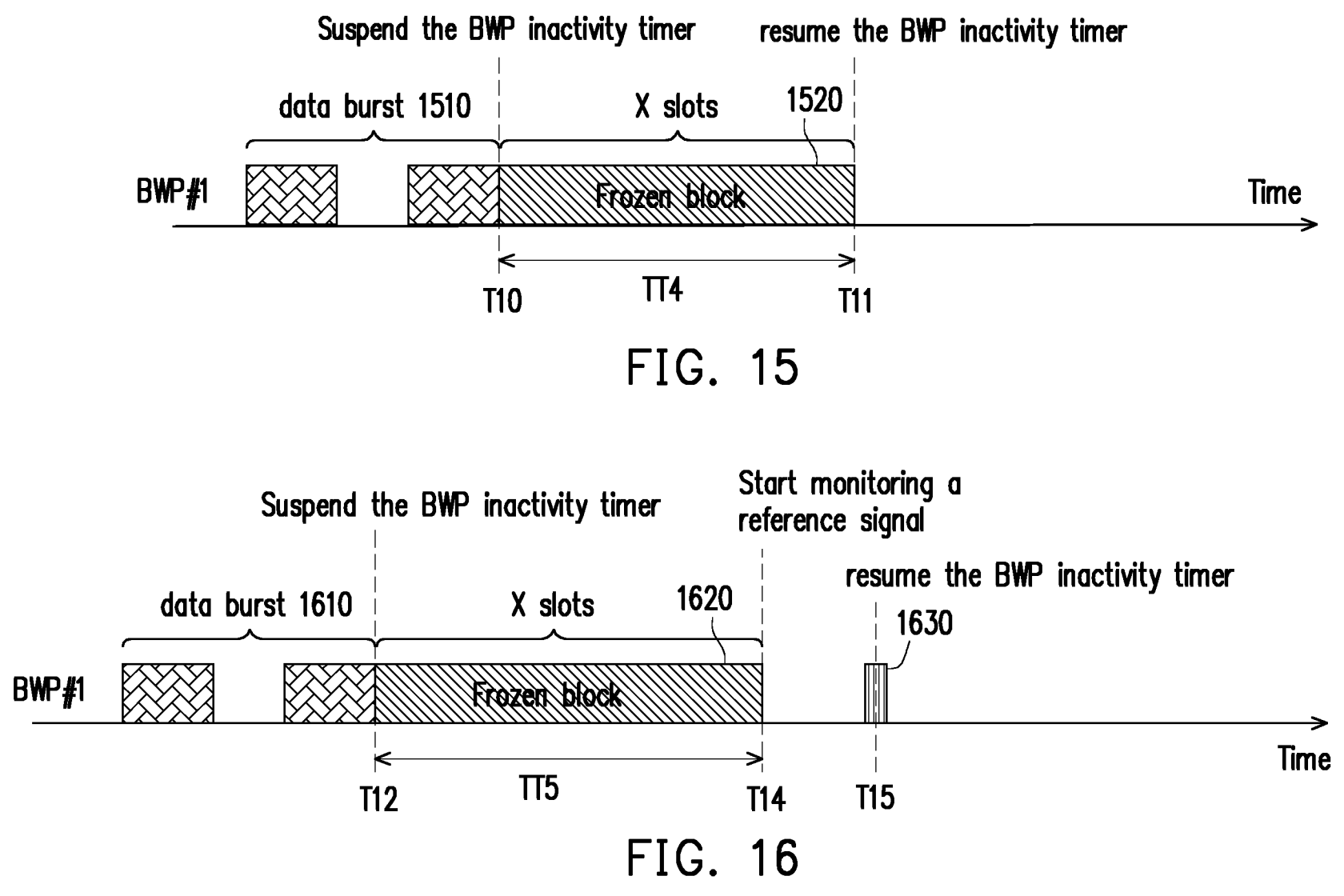

FIG. 15 is a schematic diagram of suspending and resuming a BWP inactivity timer according to an embodiment of the disclosure. Referring to FIG. 15, since the UE 100 is on the BWP #1 which is activated, the BWP inactivity timer corresponding to the BWP #1 is used for timing the activation time of the BWP #1. After the data burst 1510, the UE 100 may suspend the BWP inactivity timer corresponding to the BWP #1 in response to the ending of the data burst 1510 at the time point T10. After the time point T10, the frozen block 1520 is configured by the BS 200. Therefore, the UE 100 may stop monitoring PDCCH and/or a reference signal and suspend the BWP inactivity timer within the frozen block 1520 during the time period TT4. In response to expiration of the time period TT4 at the time point T11, the UE 100 may start monitoring PDCCH and/or the reference signal and resume the BWP inactivity timer, such that the BWP inactivity timer may keep running after the time point T11.

FIG. 16 is a schematic diagram of suspending and resuming a BWP inactivity timer according to an embodiment of the disclosure. Referring to FIG. 16, since the UE 100 is on the BWP #1 which is activated, the BWP inactivity timer corresponding to the BWP #1 is used for timing the activation time of the BWP #1. After the data burst 1610, the UE 100 may suspend the BWP inactivity timer corresponding to the BWP #1 in response to the ending of the data burst 1610 at the time point T12. After the time point T12, the frozen block 1620 is configured by the BS 200. Therefore, the UE 100 may stop monitoring PDCCH and a reference signal and suspend the BWP inactivity timer within the frozen block 1620 during the time period ITS. In response to expiration of the time period TT5 at the time point T14, the UE 100 may start monitoring the reference signal, such as PSS, SSS, DMRS, PBCH, CSI-RS, wake-up signal, or preamble, and still suspend the BWP inactivity timer. Upon receiving the reference signal 1630 at the time point T15 the UE may resume the BWP inactivity timer, such that the BWP inactivity timer may keep timing after the time point T15. In an embodiment, the reference signal may be configured with a periodicity or a time shift.

In one embodiment, a minimum staying period (i.e., staying period) is considered for channel uncertainty. During the minimum staying period, the UE 100 may not perform the BWP switching procedure and maintain the current activated BWP in activated state. Specifically, in response to a trigging condition, the UE 100 may stay in the first BWP without performing the BWP switching procedure at least for a staying period. It should be noted that, the BWP inactivity timer corresponding to the first BWP continues running during the staying period. That is, no matter the BWP inactivity timer is expired or not, the UE 100 may not perform BWP switching procedure within the minimum staying period. In an embodiment, the minimum staying period may be configured by the BS 200, and the minimum staying period may be UE-specific or BWP-specific. In an embodiment, the minimum staying period may be a fixed value. The time duration of the minimum staying period may be determined according to the subcarrier spacing (SCS) of active BWP, default BWP, minimum (or maximum) SCS of configured BWP or predetermined SCS. Besides, the trigging condition for starting the minimum staying period includes ending of the data burst, expiration of the time period, resuming the BWP inactivity timer corresponding to the first BWP or expiration of the BWP inactivity timer corresponding to the first BWP.

Figure 17:
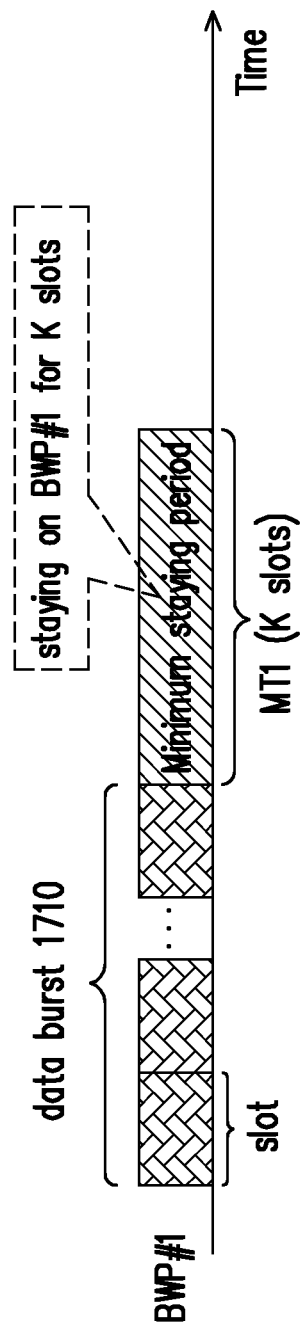
FIG. 17 is a schematic diagram of a minimum staying period after the data burst according to an embodiment of the disclosure.

FIG. 17 is a schematic diagram of a minimum staying period after the data burst according to an embodiment of the disclosure. Referring to FIG. 17, after the data burst 1710, the UE 100 may not perform the BWP switching procedure during the minimum staying period MT1. Namely, in response to ending of the data burst 1710, the UE may keep staying on BWP #1 for K slots no matter the BWP inactivity timer is expired or not. That is, if the BWP inactivity timer is expired during the minimum staying period MT1, the UE 100 may not perform the BWP switching procedure and still keep on BWP #1. It should be noted that, during the minimum staying period MT1, the UE 100 may resume the BWP inactivity timer or monitor PDCCH for data burst transmission.

Figure 18:
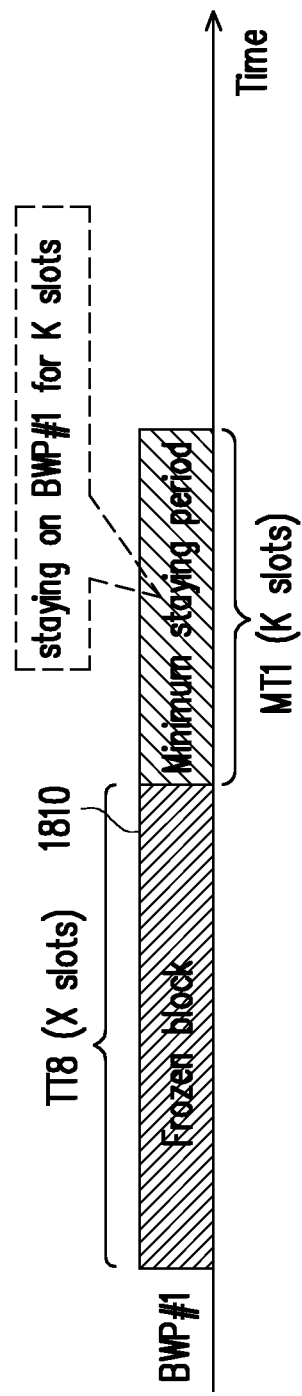
FIG. 18 is a schematic diagram of a minimum staying period after the frozen block according to an embodiment of the disclosure.

FIG. 18 is a schematic diagram of a minimum staying period after the frozen block according to an embodiment of the disclosure. Referring to FIG. 18, after the frozen block 1810, in response to expiration of the time period TT8 of the frozen block 1810, the UE 100 may keep staying on BWP #1 for K slots no matter the BWP inactivity timer is expired or not. The UE 100 may not perform the BWP switching procedure during the minimum staying period MT1. It should be noted that, during the minimum staying period MT1, the UE 100 may resume the BWP inactivity timer or monitor PDCCH for data burst transmission.

Figure 19:
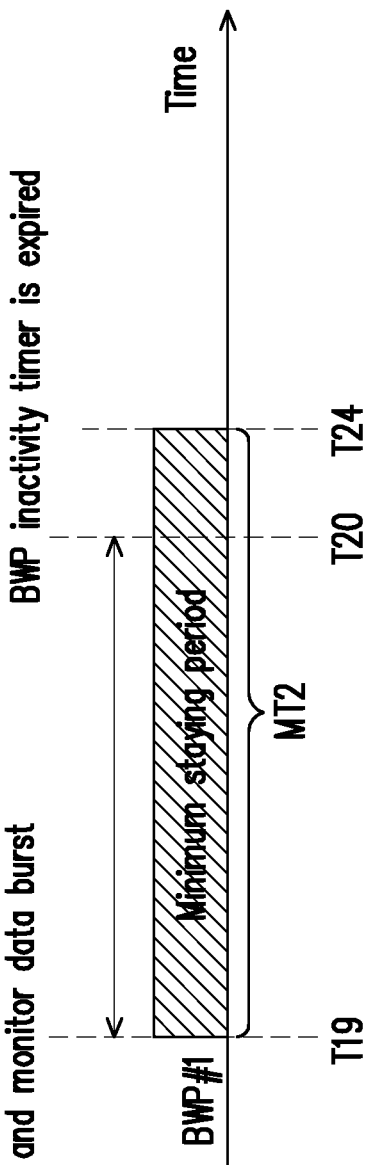
FIG. 19 is a schematic diagram of a minimum staying period after resuming the BWP inactivity timer according to an embodiment of the disclosure.

FIG. 19 is a schematic diagram of a minimum staying period after resuming the BWP inactivity timer according to an embodiment of the disclosure. Referring to FIG. 19, in response to resuming the BWP inactivity timer at the time point T19, the UE 100 may keep staying on BWP #1 for the minimum staying period MT2. At the time point T20, the BWP inactivity timer is expired due to that the UE has not received a UE-specific DCI for a time duration of the BWP inactivity timer. However, the BWP switching procedure may not performed at the time point T20 during the minimum staying period MT2. That is, in response to expiration of the BWP inactivity timer corresponding to the BWP #1 during the minimum staying period MT2, the UE 100 may stay in the BWP #1 without performing the BWP switching procedure until expiration of the minimum staying period MT2. The BWP inactivity timer may continue expired if the UE 100 does not detect UE-specific DCI during the minimum staying period MT2. After the time point T24, since BWP inactivity timer is still expired, the UE 100 may perform the BWP switching procedure in response to expiration of the minimum staying period MT2.

Figure 20:
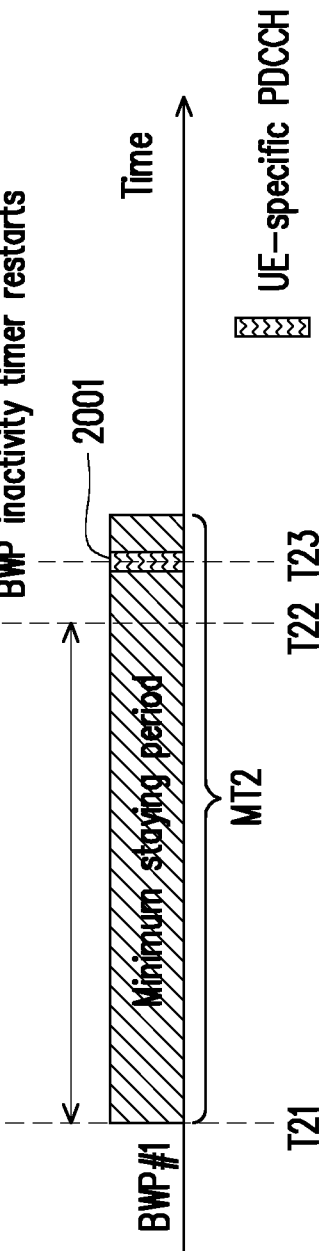
FIG. 20 is a schematic diagram of a minimum staying period after resuming the BWP inactivity timer according to an embodiment of the disclosure.

FIG. 20 is a schematic diagram of a minimum staying period after resuming the BWP inactivity timer according to an embodiment of the disclosure. Referring to FIG. 20, in response to resuming the BWP inactivity timer at the time point T21, the UE 100 may keep staying on BWP #1 for the minimum staying period MT2. At the time point T22, the BWP inactivity timer is expired due to that the UE has not received a UE-specific DCI for a time duration of the BWP inactivity timer. However, the BWP switching procedure may not performed at the time point T20 during the minimum staying period MT2. At the timer point T23, in response to receiving a timer restart signal 2001 after the expiration of the BWP inactivity timer corresponding to the BWP #1 during the minimum staying period MT2, the UE 100 may restart the BWP inactivity timer corresponding to the BWP #1 which is in active state. In an embodiment, the timer restart signal may be a UE-specific DCI.

In an embodiment, if the minimum staying period is expired and the BWP inactivity timer is expired, the UE 100 may stop monitoring PDCCH for data burst, stop enabling the minimum staying period and the BWP inactivity timer, and perform the BWP switching procedure. If the minimum staying period is expired but the BWP inactivity timer is not expired, the UE 100 may monitor PDCCH for data burst and stop enabling the minimum staying period. If the minimum staying period is not expired but the BWP inactivity timer is expired, the UE 100 may stop enabling the BWP inactivity timer and monitor PDCCH for data burst but may not perform the BWP switching procedure. If the minimum staying period is not expired and the BWP inactivity timer is not expired, the UE 100 may monitor PDCCH for data burst but may not perform the BWP switching procedure.

Figure 21:
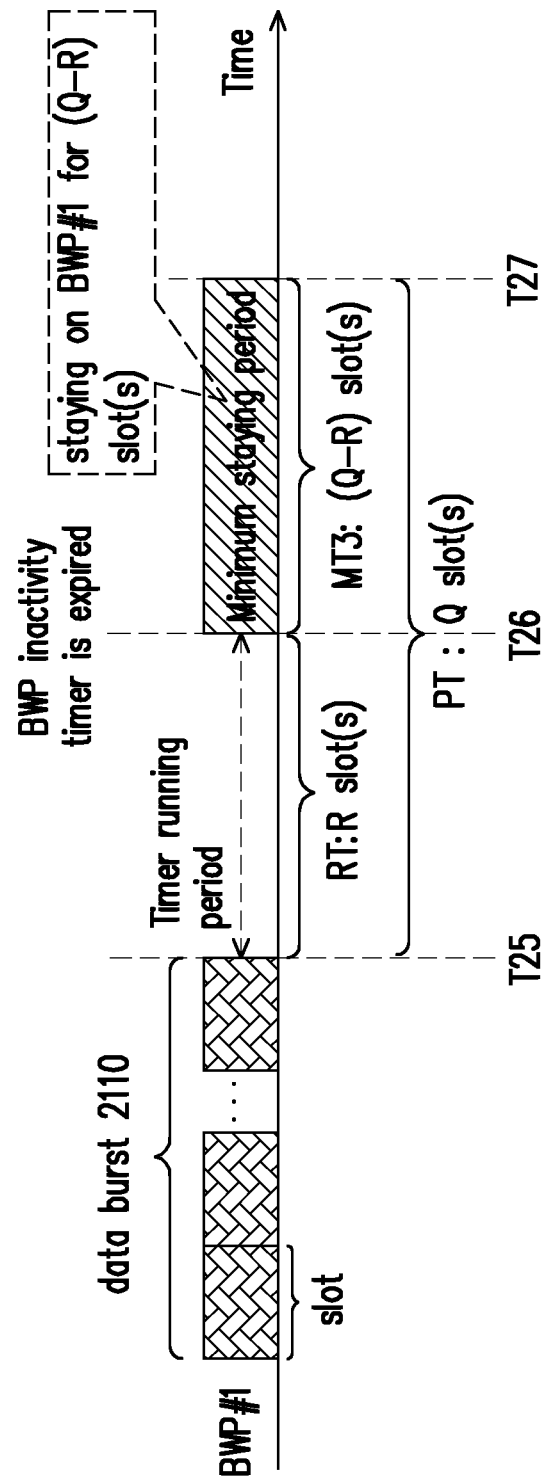
FIG. 21 is a schematic diagram of a dynamic minimum staying period according to an embodiment of the disclosure.

In an embodiment, a time duration of the minimum staying period may be dynamic based on the running status of the BWP inactivity timer. FIG. 21 is a schematic diagram of a dynamic minimum staying period according to an embodiment of the disclosure. Referring to FIG. 21, the UE 100 may determine a time duration of the minimum staying period MT3 according to a running time period RT of the BWP inactivity timer and a predefined time period PT. The time duration of the predefined time period PT may be configured by the BS 200 or may be a fixed value. In FIG. 21, the time duration of the predefined time period PT is Q slots. Besides, the running time period RT is from the end of the data burst 2110 to the time point T26 at which the BWP inactivity timer is expired. That is, the BWP inactivity timer keeps running during the running time period RT which is from the time point T25 to the time point T26. At the time point T26, the BWP inactivity timer is expired. The BWP inactivity timer keeps running for R slots from the time point T25 to the time point T26. Therefore, the time duration of the minimum staying period MT3 is (Q-R) slots, and the UE 100 may stay on BWP #1 at least for (Q-R) slots. The UE 100 may not perform the BWP switching procedure for (Q-R) slots during the minimum staying period MT3. It should be noted that, if the time duration of the running time period RT is greater than the predefined time period PT (i.e. R>Q), there may be no minimum staying period.

Figure 22:
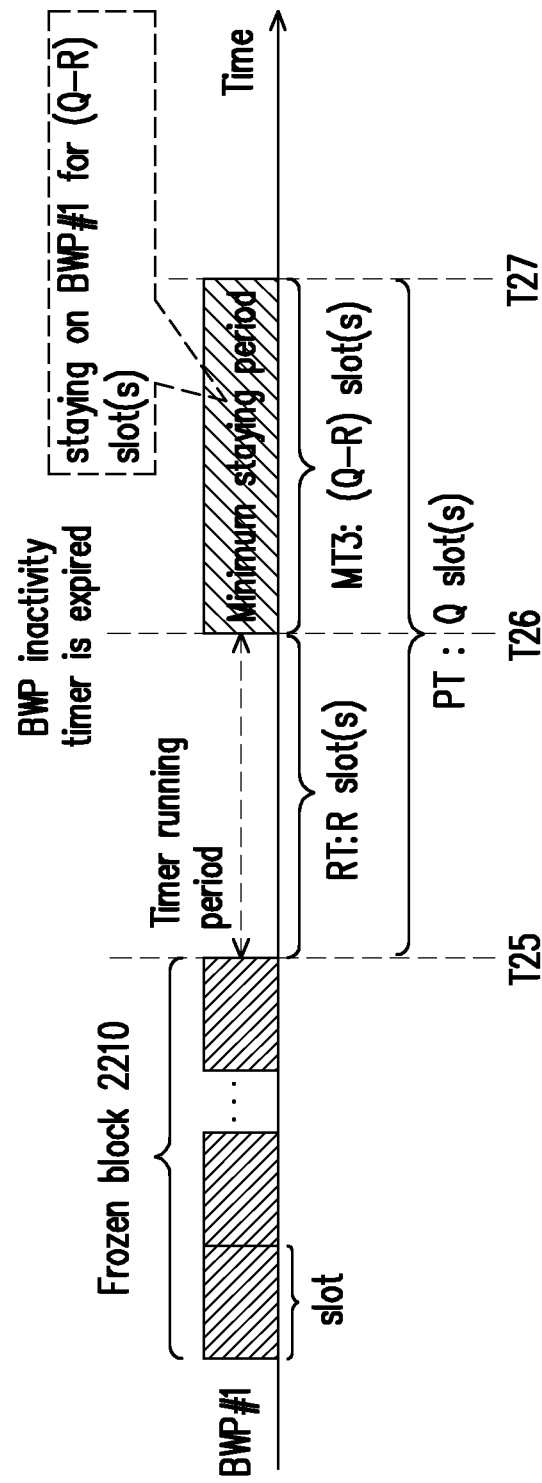
FIG. 22 is a schematic diagram of a dynamic minimum staying period according to an embodiment of the disclosure.

FIG. 22 is a schematic diagram of a dynamic minimum staying period according to an embodiment of the disclosure. Referring to FIG. 22, after the time point T25, the operation of the UE 100 is similar with the operation of the UE 100 described above for FIG. 21. It should be noted that, the time point T25 in FIG. 22 is ending of the frozen block 2210, and the running time period RT is from the end of the frozen block 2210 to the time point T26 at which the BWP inactivity timer is expired.

In an embodiment, if the predefined time period for indicating the dynamic minimum staying period is expired and the BWP inactivity timer is expired, the UE 100 may stop enabling the predefined time period for indicating the dynamic minimum staying period and the BWP inactivity timer, stop monitoring PDCCH for data burst and perform the BWP switching procedure. If the predefined time period for indicating the dynamic minimum staying period is expired but the BWP inactivity timer is not expired, the UE 100 may stop enabling the predefined time period for indicating the dynamic minimum staying period and monitor PDCCH for data burst. If the predefined time period for indicating the dynamic minimum staying period is not expired but the BWP inactivity timer is expired, the UE 100 may stop enabling the BWP inactivity timer, trigger the minimum staying period and monitor PDCCH for data burs but may not perform the BWP switching procedure. If the predefined time period for indicating the dynamic minimum staying period is not expired and the BWP inactivity timer is not expired, the UE 100 may monitor PDCCH for data burst.

It should be noted that, If the BWP inactivity timer with a great time duration is configured to the UE 100, the UE 100 may stay on the BWP for a long time even though the BS 200 is not able to provide service. In one embodiment, considering the above scenario, in addition to the BWP inactivity timer, a timer (also called as a burst inactivity timer) is proposed in the disclosure. The length of the burst inactivity timer may be a fixed value or a configured value configured by the BS 200, and the configured value is UE-specific or BWP-specific.

In one embodiment, the UE 100 may monitor a first DL signal and stop monitoring the second DL signal after a data burst on a BWP, and the UE 100 may resume monitoring the second DL signal in response to receiving the first DL signal. In such scenario, the UE 100 may set or trigger the burst inactivity timer to run in response to receiving the second DL signal. Further, before the burst inactivity timer is expired, the UE 100 may maintain monitoring the second DL signal. Before the burst inactivity timer is expired, the UE 100 may start or restart the burst inactivity timer in response to receiving the second DL signal. In one embodiment, the burst inactivity timer is configured by the number of slots. When the burst inactivity timer is running, the burst inactivity timer is decremented at the end of each slot. In one embodiment, in response to the burst inactivity timer is expired, the UE 100 may perform a BWP switching procedure and monitor the first DL signal. In detail, in response to the burst inactivity timer is expired, the UE 100 may perform a BWP switching procedure from a first BWP to a second BWP. After the UE 100 switches to the second BWP, the UE 100 may monitor the first DL signal on the second BWP.

In one embodiment, the UE 100 may trigger a burst inactivity timer to run in response to expiration of the time period of a frozen block or in response to ending of the data burst. That is, the burst inactivity timer may be enabled, started or resumed in response to expiration of the time period of a frozen block or in response to ending of the data burst. The burst inactivity timer may be enabled, started or resumed from a slot/symbol indicated by the BS 200.

In one embodiment, the UE 100 may stop or restart the burst inactivity timer in response to receiving a downlink signal. The downlink signal for stopping or restarting the burst inactivity timer may include a UE-specific DCI, a common DCI, a group-common DCI, a DCI in UE-specific search space, a DCI in common search space or a reference signal. That is, the burst inactivity timer may be disabled, stopped or restart upon detecting a DL signal. In response to the burst inactivity timer is expired, the UE 100 may perform a BWP switching procedure, a state transition procedure or a random access procedure while the BWP inactivity timer in not expired.

Figure 23:
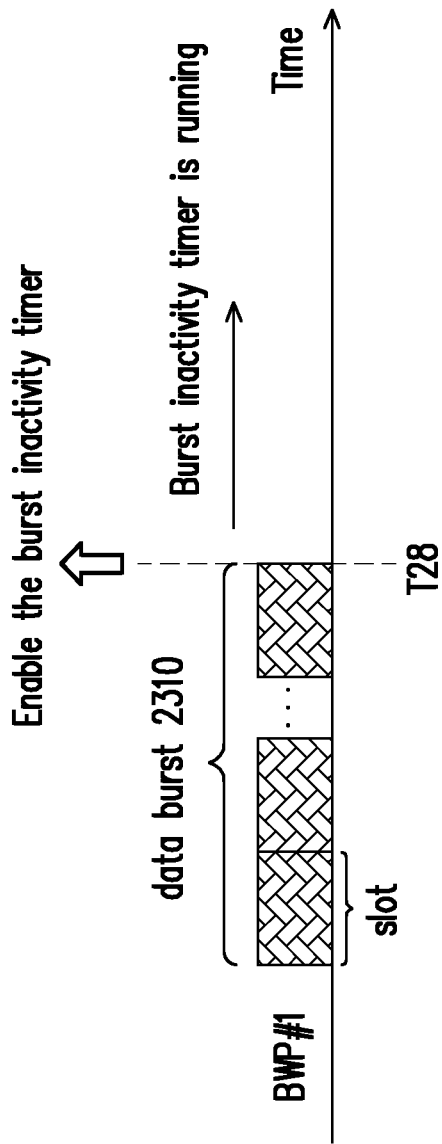
FIG. 23 is a schematic diagram of enabling a burst inactivity timer in response to ending of the data burst according to an embodiment of the disclosure.

FIG. 23 is a schematic diagram of enabling a burst inactivity timer in response to ending of the data burst according to an embodiment of the disclosure. Referring to FIG. 23, after the data burst 2310, the burst inactivity timer is triggered to run in response to ending of the data burst 2310 at the time point T28. If the burst inactivity timer is expired after the time point T28, the UE 100 may perform a BWP switching procedure, a state transition procedure or a random access procedure while the BWP inactivity timer in not expired. However, in another embodiment, the burst inactivity timer may be triggered to run in response to a DL signal (i.e. second DL signal), and such DL signal may be received within the data burst 2310. Therefore, the burst inactivity timer may be triggered to run within the data burst 2310. Further, the burst inactivity timer may be repeatedly restarted within the data burst 2310 in response to repeatedly receiving the DL signal within the data burst 2310.

Figure 24:
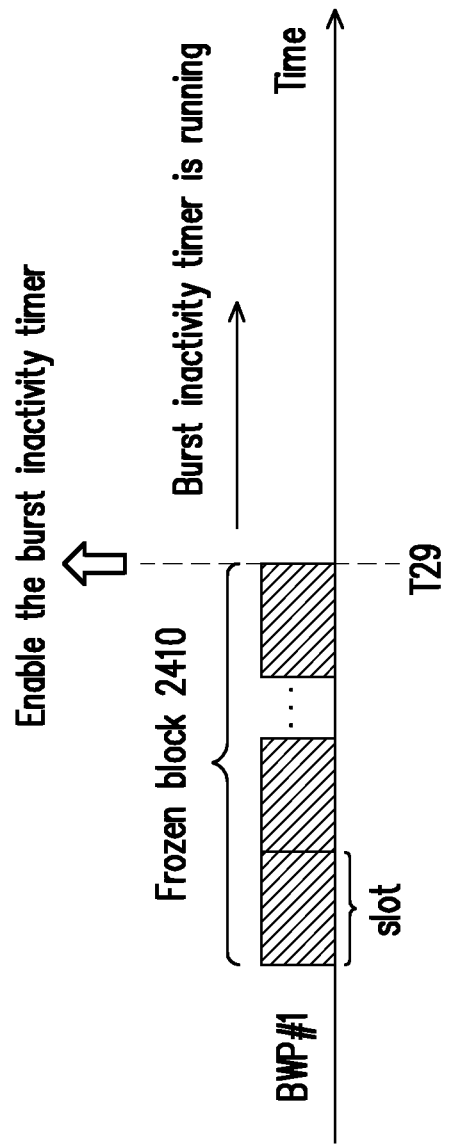
FIG. 24 is a schematic diagram of enabling a burst inactivity timer in response to expiration of the time period according to an embodiment of the disclosure.

FIG. 24 is a schematic diagram of enabling a burst inactivity timer in response to expiration of the time period according to an embodiment of the disclosure. Referring to FIG. 24, after the frozen block 2410, the burst inactivity timer is triggered to run in response to expiration of the time period of the frozen block 2410 at the time point T29. If the burst inactivity timer is expired after the time point T29, the UE 100 may perform a BWP switching procedure, a state transition procedure or a random access procedure while the BWP inactivity timer in not expired.

Figure 25:
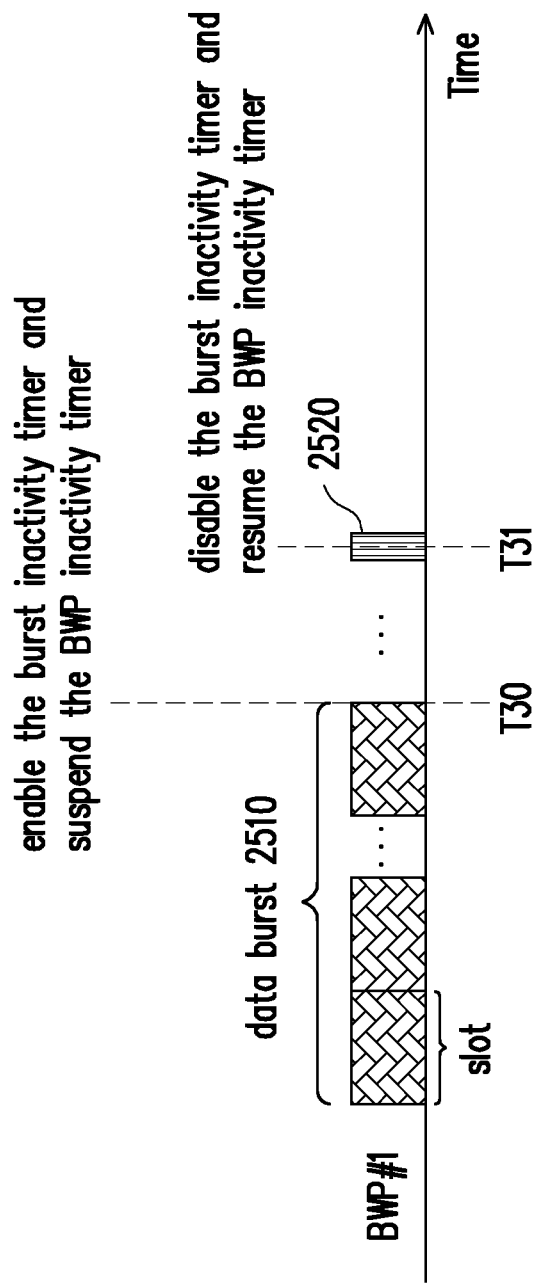
FIG. 25 is a schematic diagram of enabling a burst inactivity timer and a BWP inactivity timer according to an embodiment of the disclosure.

FIG. 25 is a schematic diagram of enabling a burst inactivity timer and a BWP inactivity timer according to an embodiment of the disclosure. Referring to FIG. 25, after the data burst 2510, the UE 100 may enable the burst inactivity timer and suspend the BWP inactivity timer in response to ending of the data burst 2510 at the time point T30. In response to receiving the DL signal 2520 at the time point T31, the UE 100 may disable or restart the burst inactivity timer and resume the BWP inactivity timer. The DL signal 2520 may be any kind of PDCCH or reference signal.

Figure 26:
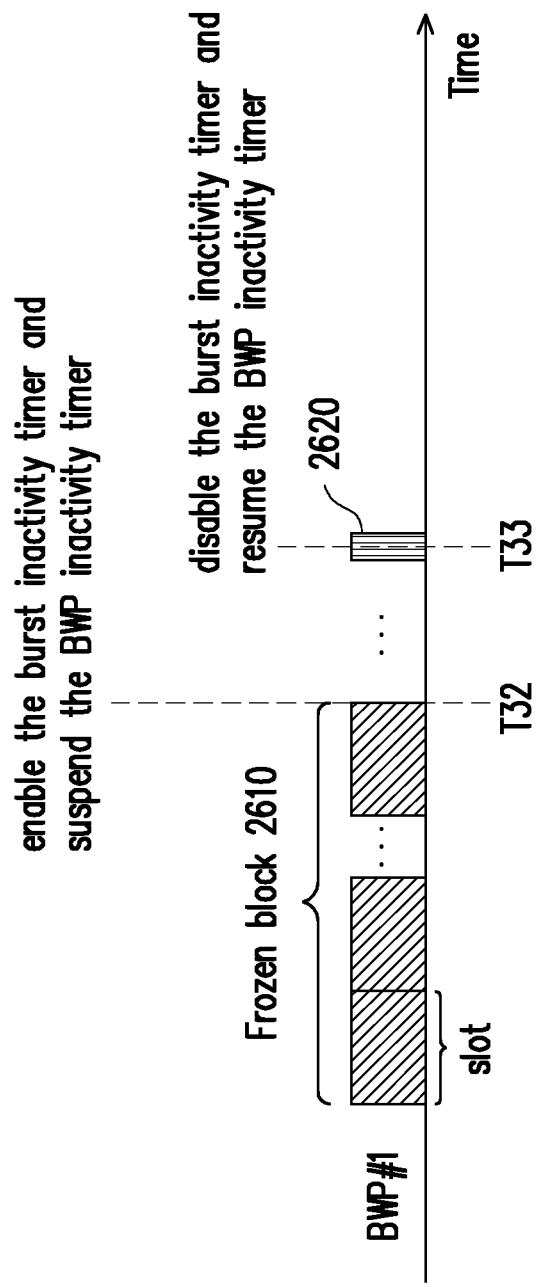
FIG. 26 is a schematic diagram of enabling a burst inactivity timer and a BWP inactivity timer according to an embodiment of the disclosure.

FIG. 26 is a schematic diagram of enabling a burst inactivity timer and a BWP inactivity timer according to an embodiment of the disclosure. Referring to FIG. 26, after the frozen block 2610, the UE 100 may enable the burst inactivity timer and suspend the BWP inactivity timer in response to expiration of the time period of the frozen block 2610 at the time point T32. In response to receiving the DL signal 2620 at the time point T32, the UE 100 may disable or restart the burst inactivity timer and resume the BWP inactivity timer. The DL signal 2620 may be any kind of PDCCH or reference signal.

In one embodiment, if the burst inactivity timer is expired, the UE 100 may stop monitoring PDCCH for data burst, stop enabling the burst inactivity timer and the BWP inactivity timer, and perform the BWP switching procedure. If the BWP inactivity timer is expired while the burst inactivity timer is running, the UE 100 may stop monitoring PDCCH for data burst, stop enabling the burst inactivity timer and the BWP inactivity timer, and perform the BWP switching procedure. If the BWP inactivity timer is not expired while the burst inactivity timer is running, the UE 100 may monitor PDCCH for data burs but may not perform the BWP switching procedure.

In view of the aforementioned descriptions, the present disclosure provides a method for downlink reception via a BWP in unlicensed band used by UE. After a data burst, the UE may stop monitoring the DL signal (e.g. PDCCH or a reference signal) until the configured time period is expiration or a reference signal is receiving. Accordingly, the UE power consumption may be reduced. Further, the BWP inactivity timer may be suspend after the data burst or a frozen block, and the minimum staying period is designed for suspending the BWP switching, such that the unnecessary BWP switching may be avoided. Moreover, the operation of the burst inactivity timer may avoid the scenario in which the UE stay on one channel for long time when the BS is not able to provided service. It should be noted that this disclosure does not require all the aforementioned advantages.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations could be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for downlink reception in unlicensed band used by a user equipment (UE), the method comprising:
   after a data burst transmitted in a unlicensed serving cell, monitoring a first DL signal and stop monitoring a second DL signal according to a DCI indicating the length or the end of the data burst; and
   in response to receiving the first DL signal, starting monitoring the second DL signal and stopping monitoring the first DL signal,
   wherein the data burst is transmitted via a first bandwidth part (BWP) of a plurality BWP and each of the plurality BWP is configured with a BWP-ID, wherein each of the plurality BWP comprises at least one PRB.

2. The method according to claim 1, wherein the second DL signal comprises a DCI.

3. The method according to claim 1, wherein the method further comprises:
   setting a timer to run in response to receiving the second DL signal.

4. The method according to claim 3, wherein the length of the timer comprises a fixed value or a configured value configured by a base station, and the configured value is UE-specific or BWP-specific.

5. The method according to claim 3, wherein the method further comprises:
   before the timer is expired, monitoring the second DL signal; and
   in response to the timer is expired, monitoring the first DL signal.

6. The method according to claim 5, wherein the method further comprises:
   in response to the timer is expired, performing a BWP switching procedure.

7. The method according to claim 3, wherein the method further comprises:
   before the timer is expired, starting or restarting the timer in response to receiving the second DL signal.

8. The method according to claim 1, wherein the method further comprises:
   starting monitoring the second DL signal after a time period.

9. The method according to claim 8, wherein the time period is larger than or equal to zero.

10. The method according to claim 1, wherein the data burst is initiated by a BS, and the BS applies a channel access procedure before transmitting the data burst.

11. The method according to claim 10, wherein the data burst comprises at least a DL transmission burst and/or at least a UL transmission burst.

12. The method according to claim 11, wherein the DL transmission burst is defined as a set of transmissions from the BS without any gaps greater than a time duration.

13. The method according to claim 11, wherein the UL transmission burst is defined as a set of transmissions from the UE without any gaps greater than a time duration.

14. The method according to claim 1, wherein the DL/UL resource of the data burst is indicated by a DCI.

15. A user equipment comprising:
a transceiver; and
a processor connected to the transceiver and configured at least to:
after a data burst transmitted in a unlicensed serving cell, monitor a first DL signal and stop monitoring a second DL signal according to a DCI indicating the length or the end of the data burst; and
in response to receiving the first DL signal, start monitoring the second DL signal and stop monitoring the first DL signal,
wherein the data burst is transmitted via a first bandwidth part (BWP) of a plurality BWP and each of the plurality BWP is configured with a BWP-ID, wherein each of the plurality BWP comprises at least one PRB.

16. The user equipment according to claim 15, wherein the second DL signal comprises a DCI.

17. The user equipment according to claim 15, wherein the processor is configured to:
set a timer to run in response to receiving the second DL signal.

18. The user equipment according to claim 17, wherein the length of the timer comprises a fixed value or a configured value configured by a base station, and the configured value is UE-specific or BWP-specific.

19. The user equipment according to claim 18, wherein the processor is configured to:
before the timer is expired, monitor the second DL signal; and
in response to the timer is expired, monitor the first DL signal.

20. The user equipment according to claim 19, wherein the processor is configured to:
in response to the timer is expired, performing a BWP switching procedure.

21. The user equipment according to claim 17, wherein before the timer is expired, start or restart the timer in response to receiving the second DL signal.

22. The user equipment according to claim 15, wherein the processor is configured to:
start monitoring the second DL signal after a time period.

23. The user equipment according to claim 22, wherein the time period is more than zero.

24. The user equipment according to claim 15, wherein the data burst is initiated by a BS, and the BS applies a channel access procedure before transmitting the data burst.

25. The user equipment according to claim 24, wherein the data burst comprises at least a DL transmission burst and/or at least a UL transmission burst.

26. The user equipment according to claim 25, wherein the DL transmission burst is defined as a set of transmissions from the BS without any gaps greater than a time duration.

27. The user equipment according to claim 25, wherein the UL transmission burst is defined as a set of transmissions from the UE without any gaps greater than a time duration.

28. The user equipment according to claim 15, wherein the DL/UL resource of the data burst is indicated by a DCI.

* * * * *